United States Patent
Cona et al.

(10) Patent No.: US 12,008,561 B2
(45) Date of Patent: Jun. 11, 2024

(54) SYSTEM FOR VERIFICATION OF PSEUDONYMOUS CREDENTIALS FOR DIGITAL IDENTITIES WITH MANAGED ACCESS TO PERSONAL DATA ON TRUST NETWORKS

(71) Applicants: INFONETWORKS LLC, Jupiter, FL (US); Frank A Cona, Tequesta, FL (US); Michael D Palage, Tequesta, FL (US)

(72) Inventors: Frank A Cona, Tequesta, FL (US); Michael D Palage, Tequesta, FL (US)

(73) Assignee: InfoNetworks LLC, Jupiter, FL (US)

(*) Notice: Subject to any disclaimer, the term of this patent is extended or adjusted under 35 U.S.C. 154(b) by 290 days.

(21) Appl. No.: 16/389,918

(22) Filed: Apr. 19, 2019

(65) Prior Publication Data

US 2019/0333054 A1 Oct. 31, 2019

Related U.S. Application Data

(60) Provisional application No. 62/791,834, filed on Jan. 13, 2019, provisional application No. 62/678,224, filed on May 30, 2018, provisional application No. 62/660,575, filed on Apr. 20, 2018.

(51) Int. Cl.
G06Q 20/38 (2012.01)
H04L 9/08 (2006.01)
H04L 9/32 (2006.01)
H04L 9/40 (2022.01)

(52) U.S. Cl.
CPC ....... *G06Q 20/383* (2013.01); *G06Q 20/3821* (2013.01); *H04L 9/0894* (2013.01); *H04L 9/3236* (2013.01); *H04L 63/0807* (2013.01)

(58) Field of Classification Search
None
See application file for complete search history.

(56) References Cited

U.S. PATENT DOCUMENTS

| | | | | |
|---|---|---|---|---|
| 2015/0379510 | A1* | 12/2015 | Smith | G06F 21/64 705/71 |
| 2017/0177855 | A1* | 6/2017 | Costa Faidella | H04L 63/0861 |
| 2020/0145219 | A1* | 5/2020 | Sebastian | H04L 9/50 |

OTHER PUBLICATIONS

• "Collaboration: Unlocking decentralized digital identity management through blockchain", dated Apr. 4, 2018, downloaded from https://www.ibm.com/blogs/blockchain/2018/04/collaboration-unlocking-decentralized-digital-identity-management-through-blockchain/ and attached as a PDF file. (Year: 2018).*

* cited by examiner

*Primary Examiner* — Jamie R Kucab
(74) *Attorney, Agent, or Firm* — Weisberg I.P Law, P.A.

(57) ABSTRACT

The invention advantageously provides a system for the verification a user's identity and qualifications and authentication of credentials associated with a user's digital identity on a trust network (where service providers involved in a transaction may be independent parties operating with limited trust), in which a pseudonymized transaction record may be created for that digital identity and stored in a shared ledger; identifying information for a user may be retained in a custodial escrow account for that user; and transactions may be re-correlated with identifying information for authorized third parties under established "due process" rules that are appropriate for the applicable jurisdiction(s).

11 Claims, 9 Drawing Sheets

Personal data aggregated in multiple sites

Personal Data segregated and not retained

SYSTEM FOR VERIFICATION OF PSEUDONYMOUS CREDENTIALS FOR DIGITAL IDENTITIES WITH MANAGED ACCESS TO PERSONAL DATA ON TRUST NETWORKS

CROSS-REFERENCE TO RELATED APPLICATIONS

This application is related to U.S. Provisional Application Ser. No. 62/660,575 filed Apr. 20, 2018, U.S. Provisional Application Ser. No. 62/678,224 filed May 30, 2018, and U.S. Provisional Application Ser. No. 62/791,834 filed Jan. 13, 2019.

FIELD OF THE INVENTION

The invention relates to the systems for the verification of personal identity and qualifications, in particular to a system for the authentication of pseudonymous digital identity credentials on trust networks, and more particularly to managing access to an escrow of personal data associated with the digital identity credentials on (and across) limited trust networks.

BACKGROUND

It is difficult to overstate the global impact of the public Internet. It has transformed communications, commerce, information sharing, and the very manner by which human beings interact; and has become the common medium for virtually all types of transactions. Digital identities are necessary for the majority of online activity: accessing web sites, e-commerce transactions, communication among IoT devices, etc.

The term "digital identity" may broadly refer to any set of information used to represent an "entity" (e.g., a natural person or an organization, software object, device, etc.), in an online transaction, such as accessing a service or exchanging information, purchasing a product, transferring funds, or verifying information. A simple form of digital identity may be password-based access credentials and/or a user profile that a person establishes with a service provider. Other examples would be the growing number of national digital identification cards issued by governments (a form of "eID"), or credentials provided by private clearance services such as for air travel. An organization can also have a digital identity (e.g., a digital certification of good standing). And, a digital identity may be security credentials used for machine-to-machine communication, such as with transactions among devices forming the "Internet of Things" (IoT).

As illustrated in FIG. 1(a), a digital identity is typically comprised of a set of defined attributes and credentials incorporating a variety of data sets depending on its application, such as personal data (e.g., name, address, age, national id number), qualification data (e.g., educational degrees, certifications, licenses, association memberships), access privileges and/or usage data with service providers, etc., The term is also sometimes used more generally to include the digital "footprint" left by an individual's activities online, such as their browsing history and the content of cookies or online postings.

Important aspects of digital identity include validation (i.e., attestation and/or some level of "proofing" to establish the identity of an entity), issuance of digital identity credentials, authentication/verification (i.e., use of the authenticated digital identity credentials to verify qualification(s) to take some action, and updating (i.e., any changes to the credentials—changes, termination, renewal, etc.). For example, when a user wants to access a service through a web site for a provider, they typically must first be issued digital identity credentials. They prove their identity to a service provider to some degree (typically dependent on the nature of the privileges for which they would be using the digital identity), who validates their identity and provides access credentials (digital identity). When the digital identity is used to access the service provider's web site, the service provider verifies the access privileges associated with that digital identity and authorizes the user accordingly. A useful overview of the digital identity lifecycle, particularly as used with natural persons, can be found in *Technical Standards for Digital Identity* published by The World Bank.[i]

While the rapid innovation in Internet technology has enabled an increasing amount of transactions to occur entirely online, the security of digital identities and the protection of personal data has lagged behind—particularly in light of evolving data privacy regulations. Great variation in legal rights and world views for personal data presents specific challenges for digital identity. For example, the European Union's General Data Protection Regulation ("GDPR") has rigorous requirements for informed consent to the collection and use of personal data, for erasing personal data when it is no longer necessary for the purposes for which it was collected (the "right to be forgotten"), and for resolving disputes regarding personal data using an independent Data Protection Officer. Penalties for non-compliance are severe. Yet, compare the GDPR with the differing privacy approaches of the United States and China—or other countries that are adopting data security technologies, but are still developing corresponding data protection laws.

The tremendous growth in the aggregation of personal information online using digital identities has raised significant security and privacy concerns over how identity credentials are stored and used. Password-based credentials provide ever increasing security risks, as most data breaches arise from phishing or other types of social engineering.[ii] Additionally, over 45% of all credit card fraud is now online in virtual ("card not presented") transactions, with identity theft being the primary cause.[iii] In addition, with an estimated 38 billion IoT devices online by 2020,[iv] there is also a concerted effort to determine the applicable security standards for machine-to-machine communication among these devices, and to develop technologies that reduce potential breaches. While some use-specific protocols like ZigBee and Z-wave are ahead of the curve,[v] general IP-based IoT devices still pose significant risks for attacks.[vi]

There have been numerous security enhancements for digital identities (increasingly complex passwords, multi-factor authentication, device registration, biometrics, etc.). For example, the FIDO (Fast Internet Online) Alliance is promulgating standards for verification of digital identity without the need to re-enter passwords when using authenticated devices, such as biometric fingerprint authentication as adopted on smartphones by many providers.[vii] However, personal data is still aggregated with service providers, each of whom acts as a central trusted authority for verifying and managing personal data on their own systems. This creates "honeypots" of centralized personal data ripe for data breaches, as illustrated in FIG. 1(b). These "honeypots" are expense for providers to secure, are at risk of a material data breach, and create material risks from non-compliance with varying privacy laws.

The evolution of identity as a service (IDaaS) has enabled one or more aspects of a digital identity (e.g., validation/verification, issuance, authentication, and/or updating) to be "federated" with a third-party identification provider (IdP) for use across multiple providers. For example, some governments have implemented federated digital ID programs, under which citizens obtain a digital identity with an approved IdP for various services online. Examples of such systems are GOV.UK Verify in the United Kingdom[viii] and DigID in the Netherlands.[ix] Other examples include Estonia eID,[x] Astrian eID,[xi] Peru eID,[xii] and others. And, the European Union has replaced its prior electronic signature directive with its "eIDAS" regulation, to help remove "existing barriers to the cross-border use of electronic identification [for] public services" and for Member States to "encourage the private sector to voluntarily use electronic identification [for] online services or electronic transactions."[xiii] Other federated identity systems include shared authentication schemes (such as OAuth,[xiv] OpenID Connect,[xv] and SAML[xvi]) that enable a persistent log-in and/or single sign-on (SSO) for users and devices. While identifying information is not needed for authentication under such frameworks, personal data correlated to each transaction is still aggregated by service providers.

With more recently proposed "self-sovereign" identity systems, users may individually create their own digital identities without any central trust authority. The user creates a "decentralized" digital identity ("DID") incorporating various "claims" attesting to their identity and credentials for use with service providers and other parties who have agreed to a "trust framework" for verifying those claims. The reliability of these "self-attested" claims builds over time as more transactions using them are recorded on a common ledger shared across this "trust network." Self-sovereign identity systems may be implemented, for example using distributed ledger technology ("DLT") aka "blockchain." To authenticate themselves for a transaction with a service provider, a user presents a DID claim, which is cryptographically hashed using a public key infrastructure ("PKI")—e.g., a designated public key and private key for the DID—and verified on the trust network using a "consensus protocol." The mitigates the need to expose (or for a provider to retain) personal data for the user. Instead, pointers to the personal data are used and are stored in the ledger. These DID's (and associated personal data) are not tied to any one provider or central authority and remain portable with the user—which also allows for their identifying information to be "decoupled" from transactions, rendering the user anonymous. This is illustrated in FIG. 1(c).

However, while complete anonymity addresses certain data privacy concerns for users, it raises significant governance and liability issues for service providers—particularly when used globally, across national borders. Resolution of disputes (whether by a sovereign court or other tribunal) typically requires identifying information and other personal data for proof of a party's identity, proof that the tribunal has the legal authority over a person or property at issue, and proof of other facts relevant to the dispute. Beyond differences in substantive law, "due process" requirements for obtaining such personal data and using it as evidence also vary. This is further complicated when a disputing party is law enforcement or another public entity, such as in a criminal proceeding.

Service providers face significant challenges in complying with varying laws regulating personal data and mitigating their data security costs, while also complying with record retention obligations to enable law enforcement and private disputants to obtain identifying information and other personal data for certain transaction (or for the service provider to retain sufficient business records to demonstrate that it acted appropriately in a transaction). What is needed is a system that enables verification of identity and authentication of access credentials without the undue aggregation of personal data and compliance with varying applicable data protection obligations; yet also enables compliance with data retention, governance and due process requirements with respect to business records and personal data, irrespective of whether a transaction occurs across national borders.

SUMMARY OF THE INVENTION

The invention advantageously provides a system for the verification a user's identity and qualifications and authentication of credentials associated with a user's digital identity on a trust network (where service providers involved in a transaction may be independent parties operating with limited trust), in which a pseudonymized transaction record may be created for that digital identity and stored in a shared ledger; identifying information for a user may be retained in a custodial escrow account for that user; and transactions may be re-correlated with identifying information for authorized third parties under established "due process" rules that are appropriate for the applicable jurisdiction(s).

In one embodiment, the invention may provide a method and apparatus for the verification of a qualification associated with user that includes a digital identity associated with a user, the digital identity having associated data for at least one qualification of the user; an extensible digital identity token (EDIT) associated with the digital identity, the EDIT configured for use in verifying the qualification of the user; a shared ledger configured for storing a pseudonymized record of one or more transactions between the user and one or more service providers on a trust network wherein the qualification of the user is verified using the EDIT and wherein the pseudonymized record is validated by a consensus protocol prior to being added to the shared ledger; and a custodial account configured to retain identifying information for the user segregated from the pseudonymized record; wherein the custodial account is further configured to be accessed based upon determined "due process" rules, to correlate the identifying information for the user with one or more transactions in the pseudonymized record to create a combined record of the transaction, and to provide the combined record to an authorized third party based on the "due process" rules. In one embodiment, the qualification of the user may be verified by a consensus protocol using the EDIT.

In one embodiment, the "due process" rules may be determined by a processor based on inputted information, such as by using by a processor using a smart contract. The inputted information might include one or more of the a country of citizenship associated with the digital identity, a jurisdiction in which the user resides, a jurisdiction of formation for a service provider who transacted with the user, a jurisdiction in which a service provider who transacted with the user resides, a jurisdiction of formation for an IDP who issued the digital identity, a jurisdiction in which an IDP who issued the digital identity resides, a jurisdiction of formation of a custodial party authorized to access the identifying information on behalf of the user based on the "due process" rules, a jurisdiction in which a custodial party authorized to access the identifying information on behalf of the user based on the "due process" rules resides, and a jurisdiction in which the data for custodial account containing the identifying information resides. The custodial account may be segregated from the custodial accounts for other users and accessed on a single request/single account basis.

In one embodiment, the transactions in the pseudonymized record may be stored in the shared ledger in a serialized form, in which a new transaction is added based upon a cryptographic hash with prior transactions stored in the shared ledger. And, the adding of a transaction to the pseudonymized record of one or more transactions might be validated by one or more validating parties using a consensus protocol based upon proof of authority.

In one embodiment, a transaction stored in the pseudonymized record may be one or more of the creation of a digital identity, the modification of a digital identity, the segregation of identifying information for a digital identity into the custodial account, a request for the identifying information from the custodial account based on "due process" rules, the renewal of a digital identity, the compromising of a digital identity, and the revocation of a digital identity.

In one embodiment, the invention may advantageously provide the above-described system for the verification of registrants and other users among service providers for a top-level domain ("TLD"), for a pseudonymized Whois system with an immutable chain of title; or for a special request process for providing identifying information for registrants to law enforcement or private disputants that is subject to applicable "due process" constraints. Transactions stored in the pseudonymized record might include one or more requests for record data for one or more domain names, the registration of one or more domain names to a registrant, the transfer of one or more domain names to a new registrant, and the modification of record data for one or more domain names.

In one embodiment, the invention may also advantageously provide an apparatus or process for the verification of at least one qualification of a user associated with a digital identity account maintained with an identity provider the incorporates at least one digital identity associated with the digital identity account and having associated authentication data configured for use in the authentication of the digital identity to enable the user to engage in a transaction online with at least one provider; at least one credential associated with the digital identity account (having associated credential data based on at least one qualification of the user configured for use in authorizing the user to engage in the transaction online with the provider; and at least one pseudonymous identifier associated with the credential configured for use in verifying the qualification of the user for authorizing the individual to engage in the transaction online with the provider and for being stored in a pseudonymized record of the transaction between the user and the provider); and a custodial escrow associated with the digital identity account and configured to retain identifying information for the user segregated from the pseudonymized record; wherein the custodial escrow is further configured to be accessed based upon a determination by a due process engine comprising software processing inputted information in an access request using a set of due process rules to correlate the identifying information for the user with a transaction in the pseudonymized record to create a combined record of the transaction and to provide the combined record to an authorized third party based on the determination under the due process rules.

In one embodiment, the at least one credential may be created based upon a verification of the at least one qualification of the user by a trusted source. The pseudonymous identifier may also be configured for use for discovering the digital identity account with the identity provider. The credential may incorporate an extensible digital identity token (EDIT) for use in one or more selected from the group consisting of verifying the qualification of the user for authorizing the individual to engage in the transaction online and creating the pseudonymized transaction record.

In one embodiment, the inputted information may include one or more selected from the group consisting of a country of citizenship associated with a user, a jurisdiction in which a user resides, a qualification of a user as a natural person, a qualification of a user as a legal person, the credential data for a user who is an authorized third party, data indicating the basis for requesting the identifying information for user, a jurisdiction of formation for the provider in the transaction with the user, a jurisdiction in which the provider in the transaction with the user resides, a jurisdiction of formation for the identity provider maintaining the digital identity account, a jurisdiction in which the identity provider maintaining the digital identity account resides, a jurisdiction of formation of the authorized third party accessing the identifying information of the user, a jurisdiction in which the authorized third party accessing the identifying information of the user resides, and a jurisdiction in which the data for custodial escrow containing the identifying information resides. The custodial escrow may be segregated from the custodial accounts for other users and accessed on a single request/single account basis.

In one embodiment, the transaction may be one or more selected from the group consisting of creation of a digital identity, the modification of a digital identity, the segregation of identifying information for a digital identity into the custodial escrow, a request for the identifying information from the custodial escrow based on the due process rules, the renewal of a digital identity, the compromising of a digital identity, and the revocation of a digital identity. Or, the transaction may be one or more selected from the group consisting of a request for record data for one or more domain names, the registration of one or more domain names to a registrant, the transfer of one or more domain names to a new registrant, and the modification of record data for one or more domain names. Or, the transaction may be one or more selected from the group consisting of the registration or verification of web content, web pages, web sites (groups of web pages) or IoT devices (such as for security, authenticity, other IP and other legal disputes).

In one embodiment, the pseudonymized record may be stored in a shared ledger on a trust network wherein the pseudonymized record may be validated by a consensus protocol prior to being added to the shared ledger. The shared ledger may also be configured for processing a micropayment based on the access to one or more transaction records. Transactions in the pseudonymized record of one or more transactions may also be stored in the shared ledger in a serialized form, in which a new transaction is added based upon a cryptographic hash with prior transactions stored in the shared ledger. Or, the due process rules may be determined by a processor using a smart contract.

In additional embodiments, the invention may advantageously provide the above-described system for other aspects of Internet-based networks, such as with respect to a blockchain based failover for DNS resolution; or other objects associated with URL's, such as verification of web content, web pages, web sites (groups of web pages) or IoT devices (such as for security, authenticity, other IP and other legal disputes). Transactions stored in the pseudonymized record might include one or more of the registration or verification of web content, web pages, web sites (groups of web pages) or IoT devices (such as for security, authenticity, other IP and other legal disputes).

BRIEF DESCRIPTION OF THE DRAWINGS

A more complete understanding of the invention, and the attendant advantages and features thereof, will be more readily understood by reference to the following detailed description when considered in conjunction with the accompanying drawings wherein.

DETAILED DESCRIPTION

Figure 1A:
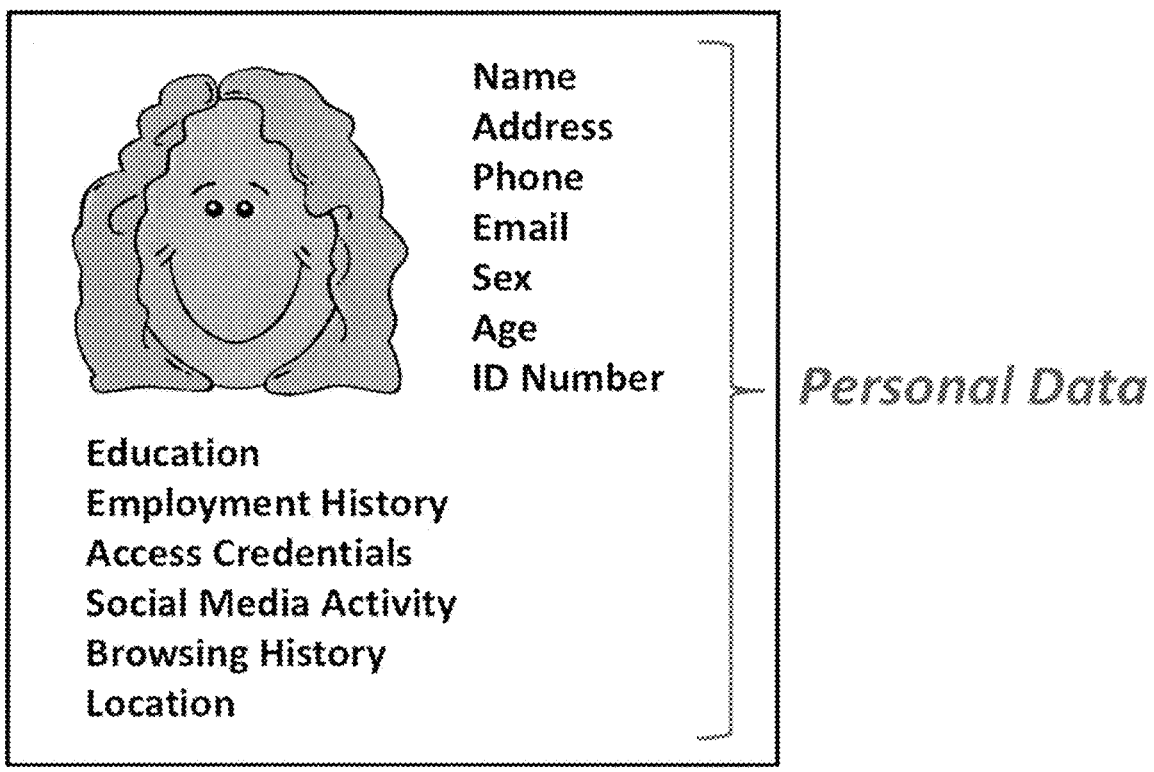
FIGS. 1(a)-(c) are illustrations of the use of digital identities.
Figure 1B:
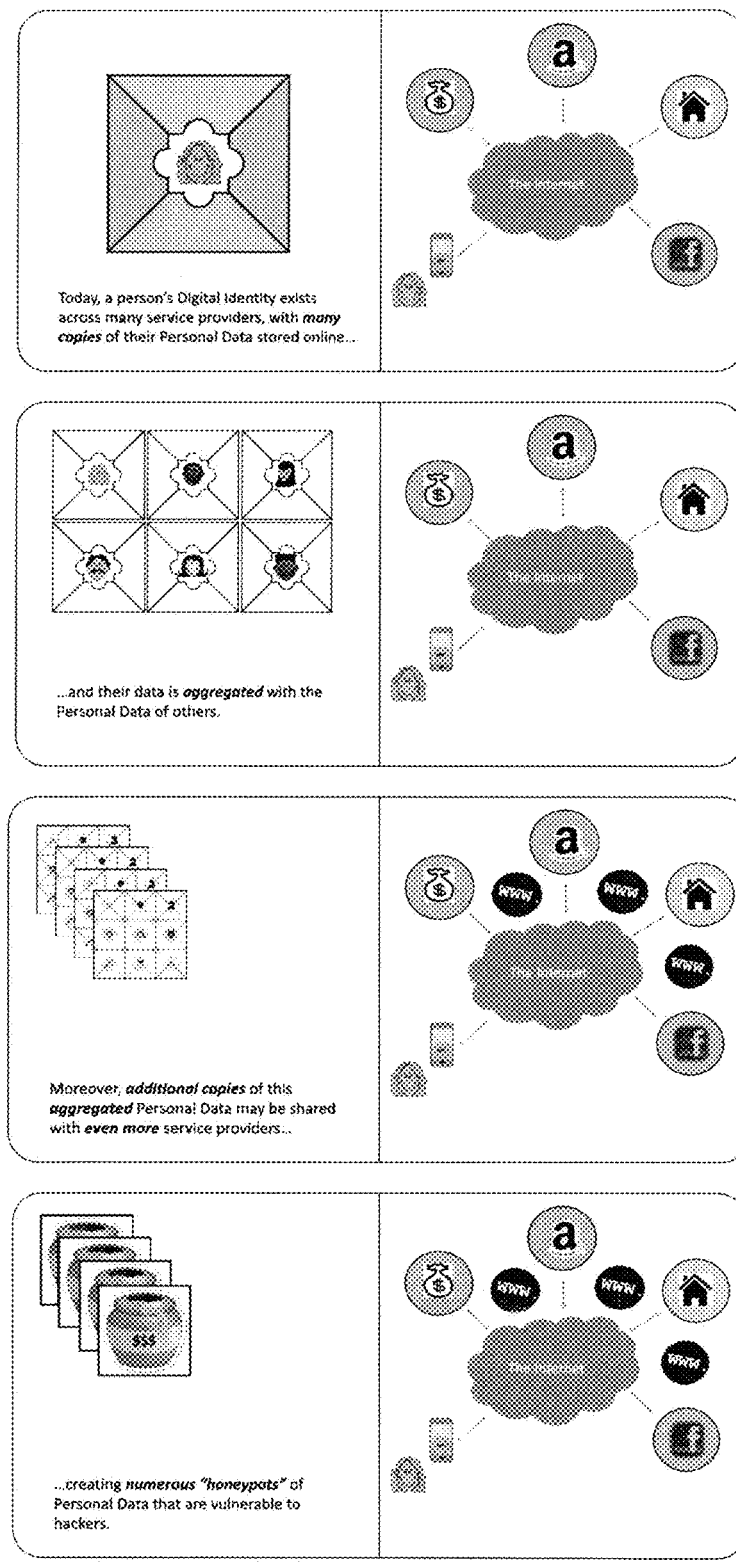
Figure 1C:
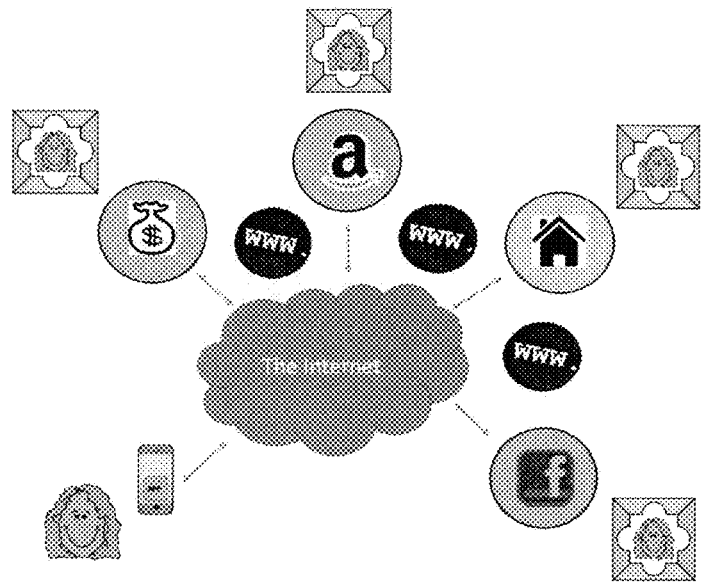
Figure 1C:
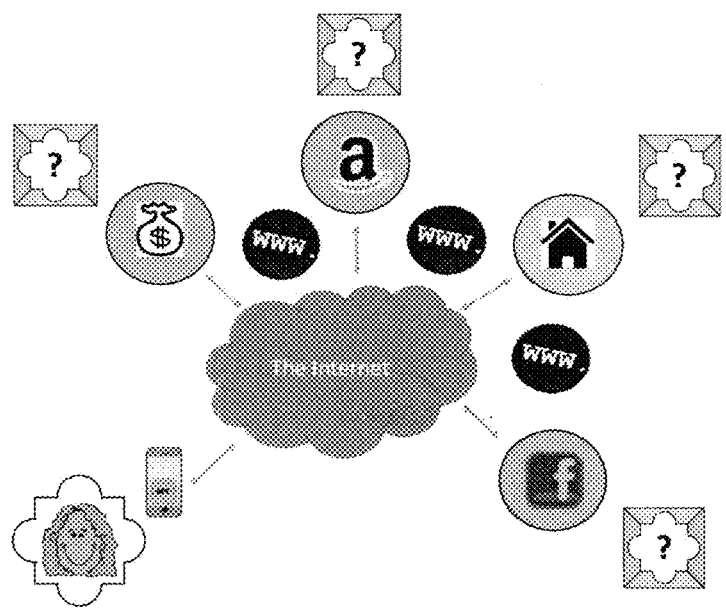

The invention advantageously provides a system, devices, and methods for governing access to, use of, and retention of personal data associated with digital identities on (and across) trust networks among service providers that may have a limited trust relationship with each other. As described herein, components that may be incorporated into a system, devices and methods in accordance with the invention have been represented where appropriate by convention symbols in the drawings, showing only those specific details that are pertinent to understanding the embodiments of the invention so as not to obscure the disclosure with details that will be readily apparent to those of ordinary skill in the art having the benefit of the description herein.

Each of the components of the system may include one or more processors located on a computer server, cloud operating environment, a smart phone or other mobile device, a personal computer or laptop, or other computing devices that may be configured to operate individually or collectively over a computer network such as the Internet in the manner of the invention as further described herein. The basic operation of standardized or customized software applications on various operating systems and across networks such as the Internet are well known in the art and will not be further elaborated upon here, except to describe aspects of the invention, which is meant to be illustrative and not limiting.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 2:
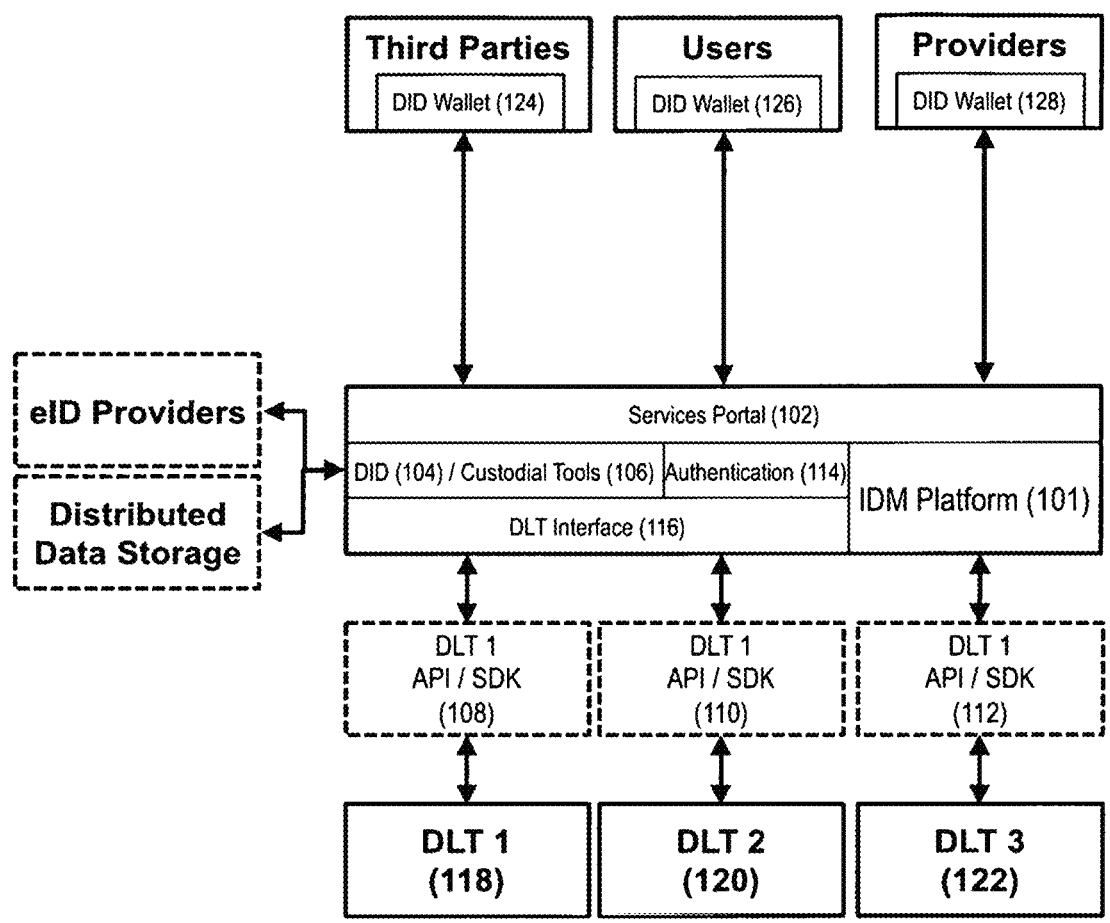
FIG. 2 is a block diagram of components of a system in accordance with aspects of the invention.

Referring now to the figures in which like reference designators refer to like elements there is shown in FIG. 2 a system constructed in accordance with aspects of the invention, which may be used to manage various types of data associated with one or more digital identities for an entity, which digital identities may be used within an ecosystem of service providers on a trust network, where the providers may have limited trust with each other.

The system may include a services portal (102), which may be a cloud-based web/mobile portal, through which a user may create and manage digital identities (which may be, for example, DID's used in the manner of the invention) using a digital identity tool (104) and a custodial escrow account using a custodial tool (106), as hereinafter described. As further described herein, a digital identity tool (104) may be used by an end user for her own digital identities, a digital identity for an organization with which she is associated, and/or a digital identity for a device that she owns, controls, or manages (again for herself or for an associated organization). One or more API/SDK's (108-112) for the service portal may also available to service providers, and the portal may be available as a multi-tenant environment to any number of IdP's in creating and managing digital identities as authorized on behalf of users. The digital identity tool may be used by an authorized IdP, for example, to manage identity validation (i.e., "know your customer" or "KYC") and/or to incorporate existing eID credentials.

A system in accordance with aspects of the invention may also include an authentication service (114) and an interface (116) to one or more ledgers (118-122) that may be shared among service providers on a trust network(s) to enable real-time verification of qualifications associated with a digital identity as further described herein. This interface is capable of operating with different technologies so that the system of the invention may operate on different shared ledgers established for different trust networks and may enable digital identities to be used across different trust networks and ecosystems. Those of ordinary skill in the art will appreciate that while aspects of the invention are discussed with regard to particular "blockchain" and DLT technologies, the invention is not limited thereto and can be used with any shared data storage technology operable in the manner of the invention.

The verification process may create an immutable, pseudonymized record of transactions in the ledger, formed, for example, by serially linking transaction data in the order that they occurred using a cryptographic hash of new transaction data with the existing ledger of transactions, and the updated ledger may then be replicated to (or accessed by) the network nodes for each participating service provider. A system of the invention may also enable an authorized party to use the interface to access pseudonymized transaction records for correlation with identifying information stored in a custodial escrow pursuant under applicable "due process" rules as further described herein.

A system of the invention may also include a digital wallet type application (124-128) with which users can locally store their DID(s), access tokens, "claims," and other data used to present their credentials for verification to service providers on the trust network (such as may be incorporated into EDIT's, as described elsewhere herein). The digital wallet may, for example, be integrated into a native iOS/Android mobile app and/or web interface. It can also be used in conjunction with third party wallets apps such as Apple Wallet.[xvii]

A system of the invention may advantageously use extensible digital identity tokens ("EDIT(s)") as further described herein as an access token in order to pseudonymize identity credentials on the trust network and/or to create a pseudonymized transaction record that may be stored in a shared ledger. The use of EDIT's provides additional advantages in a system of the invention by enabling verification of qualifications (e.g., access privileges, personal licenses, organizational charters, etc.) beyond core identifying information, enabling a user to have multiple digital identities that can each be tailored with limited rights and personal data for discrete purposes, and enabling digital identities for different "entities" to be associated with each other (e.g., for the illustrative example below, a domain name registrant may have a personal digital identity associated with a digital identity for an organization with which they are affiliated, or a registrant/organization's digital identity may be associated with a digital identity for a web site, web content or IoT device, etc.). Digital identities can be presented for any type of authentication and operate without the need for user name and password credentials (e.g., using FIDO compliant credentials).

The use of EDIT's may incorporate various mechanisms for token-based authentication and processing, such as used for persistent or shared login in compliance with OAuth 2.0, as used for the processing of credit card transactions in compliance with PCI DSS, or tokens containing executable "smart contract" code operating using blockchain technology in the manner as further described herein. The extensibility of an EDIT enables it to be used with different credentials in different data sets for different verification needs (e.g., is a person over eighteen versus what access rights do they have to services or information of a service provider), across different trust networks (e.g., a network of providers in an affiliated partner program versus within a given enterprise), or as new types of credentials to be verified are added over time. In one embodiment of a system of the invention, access to the user's identifying information may be limited to a single request/single account basis, subject to a separate process that adheres to established "due process" rules for providing identifying information to law enforcement or private disputants that are appropriate for the applicable jurisdiction(s).

Pseudonymization using EDIT's advantageously enables transaction records to be anonymized, while enabling those transaction records to still be subsequently (re)correlated with identifying information in a user's custodial account—in a controlled manner pursuant to the applicable "due process" rules and an authorized request. If a digital identity is compromised, the invention advantageously minimizes the ability for a hacker to correlate a user to their transaction records outside of a "due process" request, or to obtain identifying information for other users (or correlate their transaction records). It also enables the digital identity to be securely "re-issued" (and for individual EDIT's to be refreshed) without impacting an authorized party's ability to correlate prior transaction records under subsequent "due process" requests. DID's using the system of the invention also advantageously grow stronger with use.

Another advantage of a system of the invention is that no identifying information of a user's personal data needs to be aggregated with service providers or stored in the shared ledger. Instead, identifying information for a user may be retained in a custodial escrow account for that user, which may be segregated from the escrow accounts for other users and is only accessible by an authorized party under certain established conditions and "due process" rules. This enables service providers to better ensure their ability to comply with data privacy laws and regulations (such as the GDPR's "right to be forgotten"), while also better ensuring their ability to comply with data retention and data access obligations that the provider may have with respect to law enforcement, regulators, private disputants, or other authorized third parties—which may be in tension with data privacy laws or the retention/access laws of different jurisdictions.

The various components of a system in accordance with aspects of the invention may be used with a variety of trust frameworks operating on a trust network (or across different trust networks) in accordance with aspects of the invention described herein. Generally, a trust framework may be considered as an agreed-to mechanism for achieving large-scale trust of a digital identity online (e.g., verification of credentials associated with a digital identity) among a community of parties. that that consists of two basic parts: a trust framework (sometimes referred to as operating rules) that typically specifies certain requirements, and technical tools (e.g., specifications, technical standards and protocols) that must be implemented by the members of a trust community to achieve interoperability in the use of digital identities on a trust network among that community.

Embodiments of the invention may be configured to operate in accordance with one or more trust frameworks and across one or more trust networks. Trust frameworks may be used with the invention, for example, are those discussed by the Open Identity Exchange in their white paper entitled, *Trust Frameworks for Identity Systems*, hereby incorporated by reference herein in its entirety.[xviii] Some illustrative examples of multi-party systems that employ trust frameworks that may be incorporated in accordance with the invention include credit card systems (such as Visa or MasterCard) and their credit card processing rules and PCI DSS requirements, standards and rules for electronic payment systems (such as SWIFT or NACHA), the requirements for the use of the domain name registration system by various parties (ICANN), and more recently digital identity frameworks such as the national eID frameworks and "self-sovereign" frameworks previously discussed and hereby incorporated by reference herein in their entirety, the Universal Postal Union's standards S64-1: *Postal identity management: General concepts, definition of related terms and common protocols* and S68-1: *Postal identity management trust framework*,[xix] (hereby incorporated by reference herein in their entirety) and others. Those of ordinary skill in the art will appreciate that the invention is not limited thereto.

A digital identity in accordance with aspects of the invention may incorporate a digital identity handle or identifier associated with an entity (e.g., a natural person such as the end user, an organization, a device, or some other data object like an online posting, web page, or web site) and may operate as an address or a pointer (via pseudonymizing EDIT's) to one or more sets of credentials associated with that digital identity—which may be stored in one or more data containers for those credentials, as further described herein. While not particularly limited, examples of this handle may include a hexadecimal number or alphanumeric and/or special character-based combinations. The manner in which a digital identity identifier is generated is not limited, such as a hash of selected credentials using PKI or a manually chosen identifier. In one embodiment, the DID identifier may include a second (or higher) level domain name; e.g., "me.id.TLD" or "me.US.id.TLD" or "XYZ_Corporation.id.TLD" or "unit5.XYZ_Corp.id.TLD" or "A02FFE.id.TLD" (where "TLD" is a valid top-level domain). While an identifier may also comprise a name, email address, or the like that would identify a natural person, this may create a level of risk with respect to the management of personal data that may be otherwise addressed in the operation of a system in accordance with the invention.

A digital identity identifier may be unique among digital identity identifiers for a trust network with which is being used—which may be accomplished, for example, by generating an identifier that is itself unique to that trust network, and/or by incorporating additional symbols to the identifier when used across different trust networks; e.g., "me.id.TLD" may become "me.XYZ_reward_program.id.TLD" or "A02FFE.me.id.TLD" or "me.ABC_Corp.ID.TLD" when used across different trust networks. An example of a domain name identifier framework for a "blockchain" distributed ledger is the name resolution system put forward by the ENS Project through the Ethereum Foundation and described in detail in the documentation in their GitHub repository, the contents of which are hereby incorporated by reference herein in their entirety.[xx]

A digital identity identifier may also be used as part of a DNS-based mechanism for discovering a digital identity account for a user's digital identity that is maintained with an IdP, as is discussed in more detail below with respect to managing access to non-public domain name registration data. One example of such a discovery mechanism has been proposed by ID4Me, as described in their *Technical Overview*, which is hereby incorporated by reference herein its entirety.[xxi]

In one embodiment, components of a system in accordance with the invention may also be configured with an automated, rules-based process for generating these identifiers (e.g., using a cryptographic hash), and/or for modifying them for use across different trust networks, as further described herein. For example, these rules may be processed by DLT interface in real-time when use of a digital identity across trust networks is sought, which may be associated the modified identifier with the digital identity (and stored as part of the credentials for that digital identity). A digital identity with multiple identifiers may designate one of them as the "primary" or "default" identifier for a given trust network.

A digital identity may also incorporate EDIT's and/or one or more related data containers that include one or more sets of data for credentials for the entity associated with the digital identity. EDIT's may be single use, limited time use, limited scope use, or persistent depending on the application (and to minimize data security and privacy risks from undesired correlation to identifying information to a user). Using EDIT's, a digital identity may also be associated with one or more other digital identities for that same entity or for a different entity for a given transaction. With a system of the invention, it is possible to create a digital identity and a specific identifier with specific set of credentials to be used for a particular service provider or for situations where only those specific credentials are needed. This has the advantage of providing significant flexibility in what information about a user is provided online given the nature of a particular transaction. For example, a separate digital identity with the non-descript handle "A02FFE192B03" may be created having a limited scope EDIT for anonymously accessing web sites under where the only necessary credential is verifying that the user is over a certain age (or a limited scope, pseudonymizing EDIT may be added to an existing digital identity). As further described herein, if a legal dispute arises involving that user's actions on a site, then additional personal data about that user may only be obtained by a request made through the custodial tool, and only if the mutually agreed "due process" requirements are satisfied for the trust network on which that digital identity was used.

As noted above, users may create and manage a digital identity by using the services portal. The level of identity validation required for obtaining a digital identity may be tailored to the authorization rights being sought, as different digital identities can have different levels of security and KYC validation when issued (or re-issued). For the illustrative example further below for example, KYC would be commensurate with existing norms for validating prospective domain name registrants (or a third-party seeking access to non-public Whois data). The KYC process may subsequently be extended to include validation of qualifications for additional services—either when a digital identity is initially created or for changing the credentials associated with the digital identity. For other application, where KYC by an independent party is not required, the DID tool and custodial tool may also be used by the user to create manage their digital identity in a decentralized manner without an issuing IdP.

If the user already has a digital identity with appropriate credentials (or another accepted form of eID), these may be used for validation of their identity. Otherwise, a prospective user may upload documentation for their identity and necessary qualifications through the services portal, which may be organized within a data repository using a ticketing system so an IdP's validation staff may process KYC using that documentation. Such documentation of identity and qualifications may be used by the IdP for creating and re-issuing digital identities (and/or refreshing EDIT's) and would be stored in a secure manner and minimally retained by IdP under to a data retention policy compliant with privacy rules, such as GDPR, as well as other legal retention requirements. This documentation is not accessed by service providers on the trust network(s).

Once the identity of the individual (or organization or other entity) has been confirmed, the digital identity is created with a unique identifier as described in more detail elsewhere herein. The digital identity itself may be securely provided to the user and stored with the digital wallet on the user's designated devices (each of which may be authenticated through the application and registered as associated with that digital identity).

While a user may have multiple digital identities, each user will preferably have only one custodial escrow account. If the user has an existing custodial account, then a new digital identity for that user employing identifying information would be associated with that account. If this is the user's first such digital identity with a system of the invention, then a new custodial escrow account would be created. The custodial account may be auto-populated with any new personal data associated with this new digital identity. For the illustrative example below (but not limited thereto), the minimum data set needed for verification related to the registration and management of domains would be required, though users would be able to validate and include additional information in the account. Users may access their custodial account using the same real-time verification process as other service providers on the network. A party (including a custodial party authorized to manage the custodial account on behalf of the user) may only obtain identifying information in the custodial account through "due process" requests managed by the custodial tool and cannot otherwise access a user's personal data once it is placed into the account.

When a user submits a request for a transaction with a service provider (e.g., a domain registration or record change, or request for Whois data in the illustrative example below), the platform will prompt the user, through the digital wallet app (or in their browser), to "present" their digital identity. An EDIT may be used to verify the required qualification data for the digital identity to allow the transaction to proceed. In one embodiment, the EDIT and/or qualification data may be "hashed" using the user's PKI and authenticated on the trust network. To the extent that certain personal data must be verified for a transaction, logical characteristics of that data may be incorporated into the hash along with other transaction data so that it can be verified without exposing the data itself (e.g., instead of DOB=1 Jan. 1967, the value OverEighteen="yes" can be used).

In one embodiment, the EDIT (and required qualifications) may be authenticated by an IdP, by use of a "consensus" protocol to mathematically validate the qualifications for the pseudonymized DID as further described herein, or by a hybrid of the two based on the transaction. Those of ordinary skill in the art will appreciate that a consensus protocol is not limited to any particular protocol (e.g., Proof of Work, Proof of Stake, Proof of Authority, etc. for blockchain-based ledgers), as the particular shared ledger technology is not particularly limited in this embodiment as long as it operates in accordance with the invention.

For example, a system of the invention may incorporate blockchains based on Bitcoin (such as Multichain[xxii]) or other distributed ledger platforms such as Hyperledger Fabric,[xxiii] Corda,[xxiv] Dragon Chain,[xxv] or others. Distributed ledger technology used in a system of the invention need only have the underlying characteristics that transactions for a pseudonymized user (or among pseudonymized parties) on a network may be validated in a federated and/or decentralized manner (i.e., without central authority as a "single source of truth") using an established protocol on the trust network(s) for verifying a pseudonymized user's qualifications, and for validating the transaction for adding to a shared authoritative ledger to create an immutable, pseudonymized transaction history in accordance with aspects of the invention; e.g., transactions may be verified without complete trust among the parties and a pseudonymized record of transactions can be subsequently correlated with the segregated identifying information under certain conditions to (re)create a complete record of the transaction. The use of DLT for the shared ledger of the invention is further illustrated in connection with FIG. 3(a)-(d) using Ethereum as an example. Though, those of ordinary skill in the art will appreciate that the invention is not limited thereto.

Figure 3A:
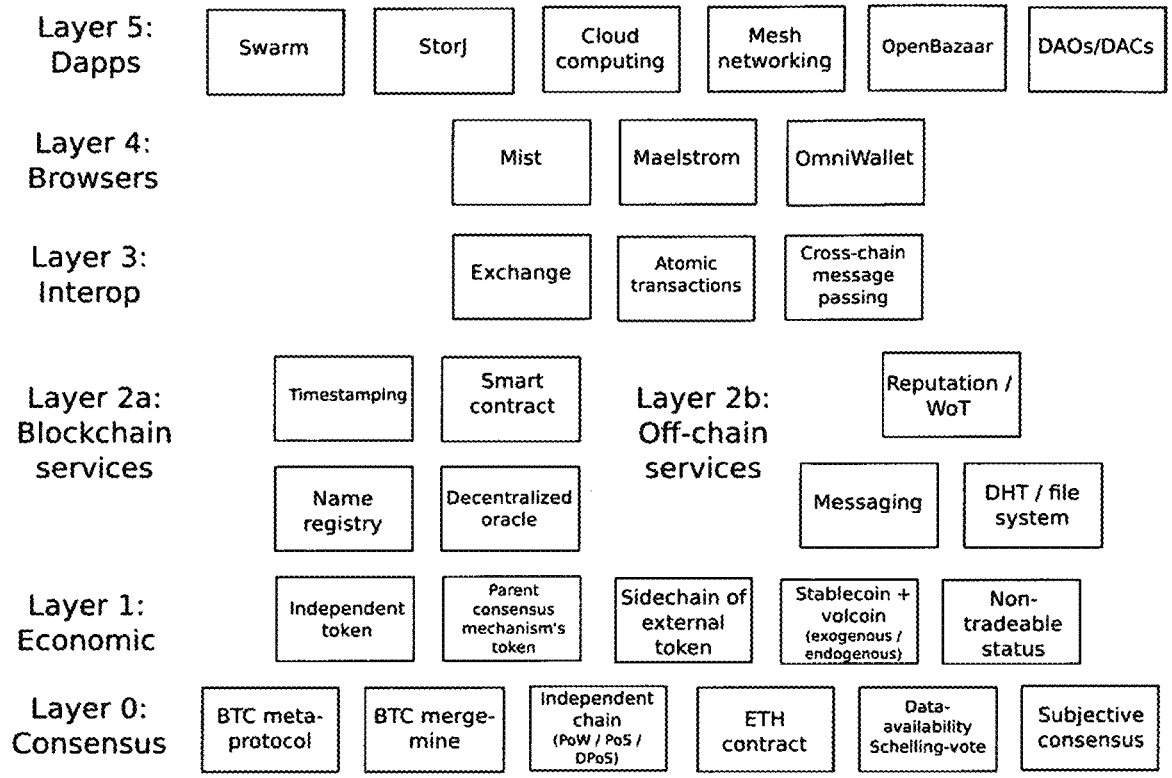
FIGS. 3(a)-(d) illustrate operation with a distributed ledger in accordance with aspects of the invention.
Figure 3B:
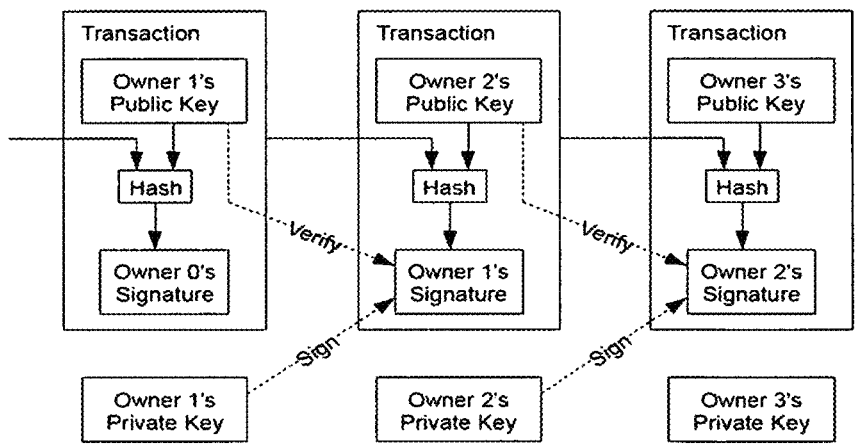
Figure 3C:
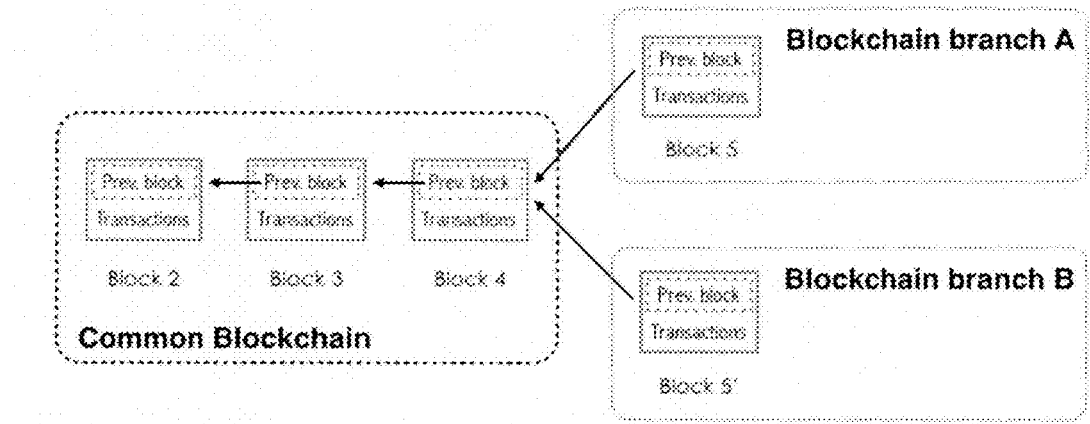
Figure 3D:
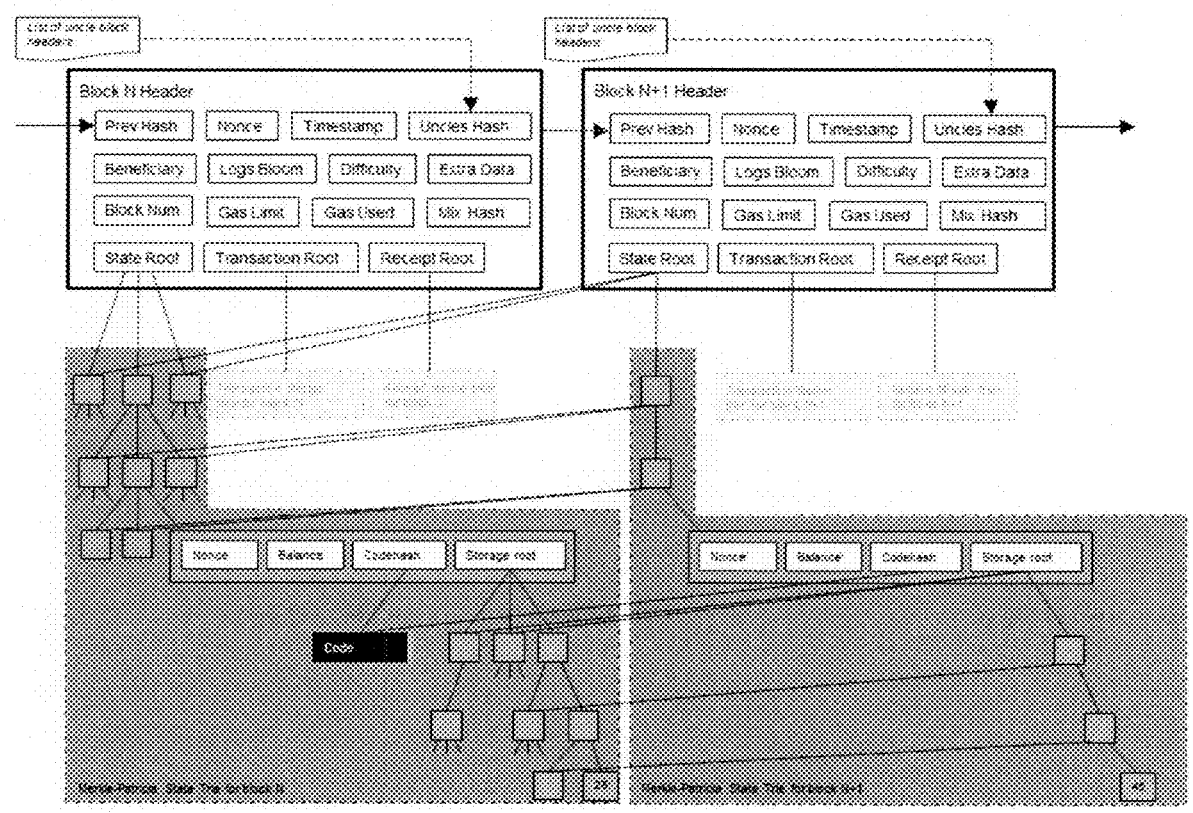

While Bitcoin and a number of other DLT technologies began specifically as systems for the anonymous exchange of a limited supply of "currency" tokens using public-private key cryptography ("cryptocurrency"), many of the features of the technology, like those noted previously, can be used for other applications. The Ethereum Foundation has been very active in fostering Ethereum for such broader use as well, as illustrated in FIG. 3(a).[xxvi] As discussed in the Ethereum paper, *ETHEREUM: A SECURE DECENTRALISED GENERALISED TRANSACTION LEDGER*[xxviii] and illustrated in FIG. 3(b), transactions on Ethereum are collated into blocks, which are sequentially chained together using a cryptographic hash as a means of reference. The blocks function as a journal, recording a series of transactions together with the previous block and an identifier for the final (current) state of the ledger. Since the system is decentralized and all parties have an opportunity to create a new block on some older pre-existing block, the resultant structure is necessarily a tree of blocks. In order to form a consensus as to which path, from root (the genesis block) to leaf (the block containing the most recent transactions) through this tree structure, known as the blockchain, there must be an agreed-upon scheme. If there is ever a disagreement between nodes as to which root-to-leaf path down the block tree is the 'best' blockchain, then a fork occurs. See FIG. 3(c).

The current consensus protocol for Ethereum is based on Proof of Work—in which parties engaging in validating transactions on the network ("miners") compete in calculating a computationally difficult mathematical proof using the hash of the current transaction data (which may be with a group of transactions) and the existing hashed blocks in the ledger to determine which path through the block tree with the added transaction(s) is the correct one; and the miner that first successfully completes this validation is rewarded financially with some portion of the cryptocurrency resulting from the transaction. The successful miner's version of the block tree becomes the authoritative ledger, which is synchronized around the network. The mathematical proof is based on inverse hashing—determining a number (nonce), so the cryptographic hash algorithm of block data results in less than a given threshold. This is further illustrated in FIG. 3(d).

While this is the current basic structure of Ethereum (and a number of other DLT's), those of ordinary skill in the art will appreciate that the manner of organizing the transactions into groups or blocks of data and manner of obtaining "consensus" and validating transactions may be changed to address performance, scalability, reliability, and the like without deviating from its applicability to the invention. For example, a consensus protocol could also incorporate Proof of Stake (the successful validator is determined by factors such as their financial stake on the network) or Proof of Burn (the validator is determined by their financial expenditure on the network). Another approach is Proof of Authority (validators are only those entities that are authorized by the trust network to determine consensus, such as by meeting certain certification criteria). Also, Ethereum currently uses a "permissionless" public network in which anyone can anonymously add themselves as a node to participate on the network, but a "permissioned" trust network may be used in accordance with aspects of the invention, in which participants meet certain criteria to participate in the network (whether anonymous, pseudonymous, or identified).

Smart contracts are an aspect of blockchain technology that enable certain actions to be taken (or not taken) based on a predetermined set of rules for the trust network, implemented using software code embedded in a token that may be executed as part of the consensus protocol or to complete a particular transaction once the authorization for the transaction has been verified by consensus. With cryptocurrencies, a token may, for example, contain very basic code relating to creating a total supply of "coins," initial distribution, rules regarding how those coins (or fractions of coins) can be exchanged, how to query coin balances, etc. An illustration of smart contract code can be found on the Ethereum web site.[xxviii]

But smart contract code can be more complex and may be used to create executable programs beyond simply exchanging information regarding "coins" on a ledger—smart contracts may be applied to any defined type of data and may be used to perform various functions on that data, like any other software application, and the inputs to (or outputs from) that processing may be recorded in the shared ledger.

Smart contracts and blockchain technology generally may also be used for creating a pseudonymized record of transactions in accordance with aspects of the invention. This technology may also be employed in determining what laws and "due process" rules (from which jurisdictions) and what contractual obligations are applicable to a request for information stored in a custodial account (e.g., based on verifying the citizenship of the holder of a DID, where the custodial data resides, the residency/citizenship of any other party to the transaction, etc.), and to apply those rules to the request (e.g., determining if the DID has appropriate personal qualifications to obtain the data requested, and verifying proof of the right to obtain the data requested for the circumstances, etc.) A history of that "due process" request transaction (i.e., the request for, and exchange of, user personal data), when it occurred, who requested it, what type of information was provided, etc. may also be recorded in the ledger. Those of ordinary skill in the art will appreciate that this is just an illustration of the use of smart contract in accordance with aspects of the invention, which is not limited thereto.

Once a user is authenticated and their qualification(s) verified, the service provider may process the transaction requested by the user. The specific transaction data stored in the distributed ledger may be limited to the verification transaction (e.g., the EDIT, the nature of the action requested, a timestamp) with other service provider data made available separately, or it can also be used to create a more complete pseudonymized record of the data involved in the transaction. This pseudonymized record may be accessed later pursuant to a "due process" request and correlated with identifying information contained in a custodial account to create a complete record of a transaction. This is explained in more detail in connection with an illustrative example as set forth below. Those of ordinary skill will appreciate that this example is provided for purpose of illustration and that the invention is not limited thereto.

Illustrative Example

In one illustrative embodiment, a system in accordance with aspects of the invention may be used with domain name management for a TLD (top level domain, such as .POST) and available to service providers operating in that ecosystem (e.g., registry operator, registrars, registrants, third parties making "due process" requests, ISP's, etc.). A system for this embodiment is illustrated in FIGS. 4(a)-(e).

In one example, this may use DID's (and/or other digital identity frameworks), a DLT, such as Ethereum[xxix] or Hyperledger Fabric, etc. through an SDK that may include an API for processing a "thin dataset" for DNS resolution (e.g., as a failover to the root system), such as current Whois data available from a "thin registry" and an "enhanced dataset" (or "thick registry" Whois data) for creating an immutable, pseudonymized record of transactions for service providers in the ecosystem for a TLD. Such an application may be used provide a GDPR compliant Whois, enhanced with a change history for each domain name, which also provides law enforcement, regulators, private disputants, and other authorized parties with appropriate access to complete record data for one or more domain names.

This illustrative example incorporates a differentiated access model for third parties to access non-public registrant data associated with domain name registrations that is consistent with the feedback provided by the European Union and the Article 29 Working Party, now the European Data Protection Board. While there are clear, legitimate interests (i.e., a "lawful purpose") for qualified third parties to access non-public registrant data, there needs to be a framework that balances these interests with those of the Data Subjects and Registration Authorities, who are looking for business certainty as to data privacy rights—not just under the GDPR but under other international privacy legislative frameworks as well.

There are several inefficiencies and inequities in the existing RDDS/Whois framework, which largely provide any third party, even those with an illegal intent, with the ability to access Personal Data about a Data Subject with little to no consequences. A Data Subject's primary recourse to avoid their Personal Data from being improperly use by a third party was to pay additional fees for a privacy/proxy service. In addition, third party Requestors having a legitimate interest in accessing the data—such as law enforcement, the intellectual property community, and the cybersecurity research community—struggled with a de-centralized system of Registrant Whois data that lacked a standard format, and in which significant portions of data they were trying to access was either shielded behind the privacy/proxy services or contained inaccurate data (often intentionally so). Registration Authorities have historically been required to make this service available at no-cost to any third party, subjecting their customers (Registrants) to unwanted scams that have resulted in real and actual harm.

While access models currently being contemplated within the ICANN community have focused on trying to differentiate accreditation for an exhaustive list of parties qualified to gain differential access, an embodiment of the system of the invention enables the access model to be improved from an accountability perspective. Regardless of how much time is invested in the compiling of lists and vetting requestors, there will undoubtedly be violations of the terms of use, and a Data Subject's Personal Data will be improperly processed. Therefore, the viability of any differentiated access model is dependent upon placing the rights of the Data Subject at the forefront and ensuring that they have recourse to be made whole in connection with any unauthorized use of their Personal Data. Unfortunately, other access models, including ICANN's Temporary Specification, have largely failed to provide any redress for Data Subject who find their Personal Data improperly processed.

The illustrative example described herein inverts this current hierarchy around Whois data, in which Data Subjects pay additional fees to secure their basic privacy rights and have little recourse against third parties that violate those privacy rights. Using a system in accordance with the invention, Data Subjects receive those basic privacy rights at no additional cost, the economic burden and legal accountability is shifted to those seeking access to these records, and Data Subject are provided with legal recourse against those that violate their rights.

Self-attestation by third parties accessing Whois data under the existing RDDS/Whois framework is not viable for protecting the privacy interests because the only recourse against self-attesters that exceed the scope of legitimate use and/or harm a Data Subject is the "threat" to have their future access cut off. This may prevent harm to other Data Subjects, but it leaves impacted Data Subjects without an effective remedy. Consequently, an improved the RDDS/Whois framework in accordance with a system of the invention may incorporate the ability to verify and authenticate Requestors, and that they have a legitimate interest for accessing and using the data. Considering the Hamilton memo[xxx] that cited the direct privity of contract between Registrar and Registrant, Registrars may be the sole gatekeeper to provide RDDS differential access via RDAP—ICANN's Registration Data Access Protocol. This would enable Registrars to better protect their customers from unauthorized access to, or use of, their Personal Data by using the audit features in RDAP (e.g., to assess whether a Requestor has exceeded the scope of the particular legitimate use for which they were authorized to use the data). In addition, if there is a failure by a Registrar to provide timely access within RDAP SLA parameters, then those Registries having "thick" registrant data could themselves provide this service as a failover.

Another feature that may be incorporated into an improved RDDS/Whois framework using a system in accordance with the invention is the ability for Registration Authorities (primarily Registrars or potentially the Registry) to impose micropayments on Requestors who are legitimate interest user for the benefits they receive for access to this data. While RDDS/Whois access has traditionally been free, there are significant costs that Registration Authorities have had to bear in providing this service, and that Registrants have had to bear in keeping their Personal Data private. Using a system in accordance with the invention, Registration Authorities may charge verified and authenticated Requestors for access to non-public Personal Data, rather than Registrants having to bear the cost of shielding their Personal Data by privacy/proxy services. These fees may, for example, be based upon the frequency of access, the type or amount of records access, and/or the nature of the particular legitimate interest for which the data is authorized to be used. The invention is not limited in this regard.

Using a system in accordance with the invention, the verification process may be decentralized to permit third-party organizations the ability to verify Requestors as legitimate interest users in various specialties (Intellectual Property, Cybersecurity, etc.) After verification, these legitimate interest users would be provided with a federated digital identity with appropriate credentials comprising attestations of their access privileges. In this example, transactions using these digital identities would be recorded on a permissioned distributed ledger maintained by Registration Authorities. These digital identities could be used to securely access the RDAP platform using multi-factor authentication while also permitting the ability to audit use of the system by legitimate interest users. This system could also process micropayments for access to Whois data, and revoke access credentials for violation of predefined conditions.

Prospective registrants or other users may obtain a digital identity from an authorized IdP by using the services portal. The level of identity validation required for obtaining a digital identity may be tailored to the authorization rights being sought, as different digital identities can have different levels of security and KYC validation when issued (or re-issued). For this illustrative example, KYC will be commensurate with existing norms for validating prospective domain name registrants. The KYC process may subsequently be extended to include validation of qualifications for additional services—either when a digital identity is initially created or for changing the credentials associated with the digital identity.

As previously discussed, if the user already has a digital identity with a system of the invention with appropriate credentials (or another accepted form of eID), these may be used for validation of their identity. Otherwise, a prospective registrant or other users may upload necessary identity and qualification documentation through the service portal. Once the identity of the individual (or organization or other entity) has been confirmed, the digital identity is created and securely provided to the user and stored with the digital wallet on the user's authenticated and registered devices, and a custodial account may be populated with any identifying information for the user, as described in more detail elsewhere herein. For this illustrative example, the minimum data set needed for verification related to the registration and management of domains (or for bulk access to domain name by law enforcement or other authorized parties) would be required, though users would be able to validate and include additional information in the account. Users may access their custodial account using their digital identity and the same verification process as other service providers on the network. An authorized party may only obtain information in the custodial account through the "due process" request system as managed by the custodial tool and cannot otherwise access personal data once it is placed into the account.

When a user submits a request for a transaction with a service provider, such as a registrar (e.g., a domain registration or record change, or bulk access to domain record data), the user will be prompted, through the digital wallet app (or in their browser), to "present" their digital identity. Their digital identity is authenticated and associated qualifications to access the requested data are verified as elsewhere described herein. With the user's qualification(s) verified, the service provider takes the action requested by the user (e.g., registering a domain name or providing the requested Whois data), and a pseudonymized record of the transaction may be recorded in a ledger accessible by authorized service providers on the trust network (registrars, the registry operator, etc.). In addition to being used to record transactions regarding Whois data maintained by the service providers, the ledger may also be used to store pseudonymized Whois records themselves. When a complete record is requested (under an authorized "due process" request), the complete Whois record can be created from the pseudonymized Whois records and the identifying information for DID's related to those records as stored in the custodial accounts. The use of a system in accordance with aspects of the invention in this illustrative example is described in more detail below in connection with FIGS. 4(a)-(e).

Anonymous RDAP Service. ICANN is currently conducting a pilot program to test a new Registration Data Access Protocol ("RDAP") for accessing Whois data. Under RDAP, a limited amount of domain name record data may still be accessed anonymously using an RDAP service provided by registrars or other authorized service providers in the ecosystem for a given TLD. Some available open source RDAP servers that may be used for this purpose include those from CNNIC, NICMx, Reddog, DNS Belgium, and ARIN.

With an anonymous RDAP service, any user may request Whois data from a registrar or other service provider (i.e., no user authentication is required). However, for anonymous RDAP access only a "thin registry" dataset need be returned. Anonymous users do not have access to the bulk of the record data for a domain name that is typically provided by a "thick registry" dataset (such as the registrant name and contact information, or the identifying information for other contacts listed in the domain record).

Tiered Access RDAP Service—User Seeks Accreditation and DID. In order to gain access to more complete Whois records, the user must be authorized to access the data requested under a tiered access system. Tiered access provides different access rights to different types of users; e.g., law enforcement agents, regulators, and private disputants (or their counsel) may have bulk access rights to domain names and data scoped by certain conditions under which access is requested, whereas other users, such as a prospective purchaser of a domain name (or group of domains), for example, may only have the right to access information for certain domains for a limited period of time as authorized by the registrant. In order for a user to qualify for access, they must be accredited (i.e., they must have sufficiently demonstrated qualifications to access the Whois data that is being requested to obtain access credentials).

In accordance with a system of the invention, a user may submit a request for a digital identity credential to an authorized IdP. The user can be any ecosystem participant; such as a registrant, registrar personnel, registry personnel, IdP personnel, a third-party requestor (such as a law enforcement agent, regulator, an IP disputant/counsel, or prospective purchaser of a domain name). In this illustrative example, the IdP may be any CA (Certification Authority) or other party certified to process users for accreditation in the ecosystem, such as a government agency, a registrar or registry, a third party authorized to manage user's custodial accounts, though the invention is not limited thereto. The user may be redirected to an IdP by a registrar when requesting Whois data or may proactively seek an appropriate digital identity ahead of any specific Whois data request.

Figure 4A:
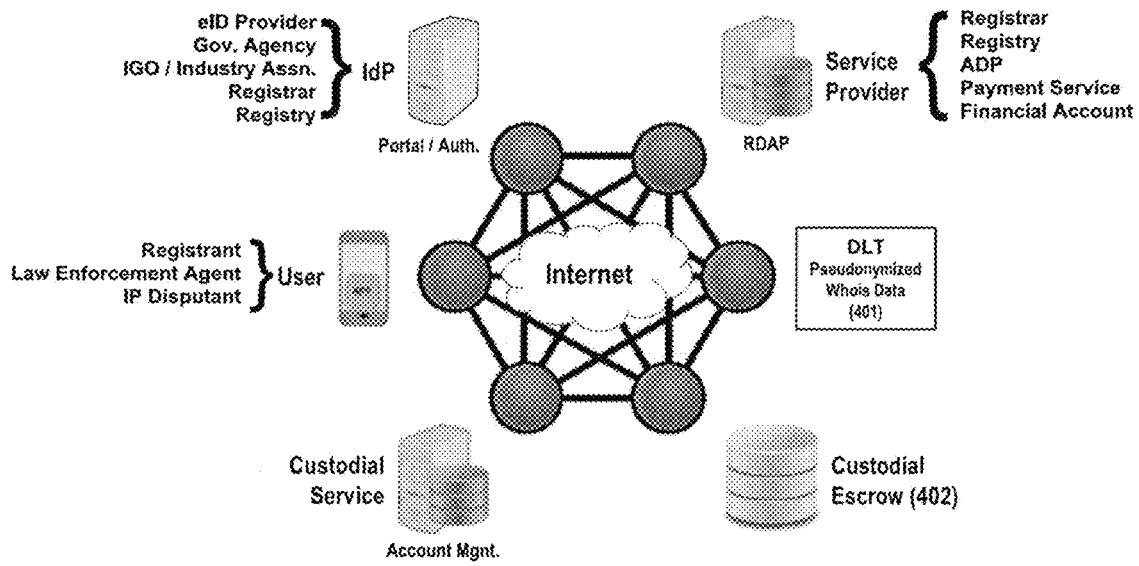
FIGS. 4(a)-(e) illustrate an embodiment of a system of the invention with respect to the management of domain name registrations.
Figure 4B:
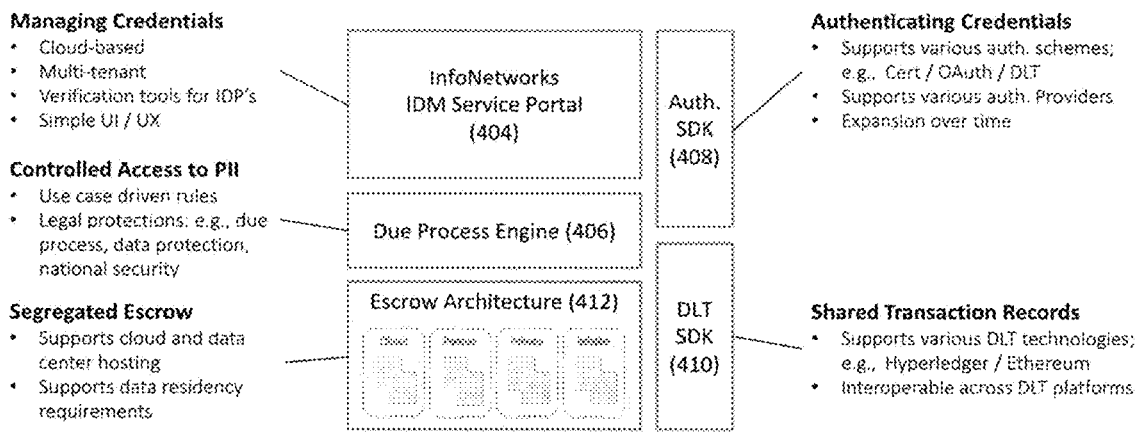
Figure 4C:
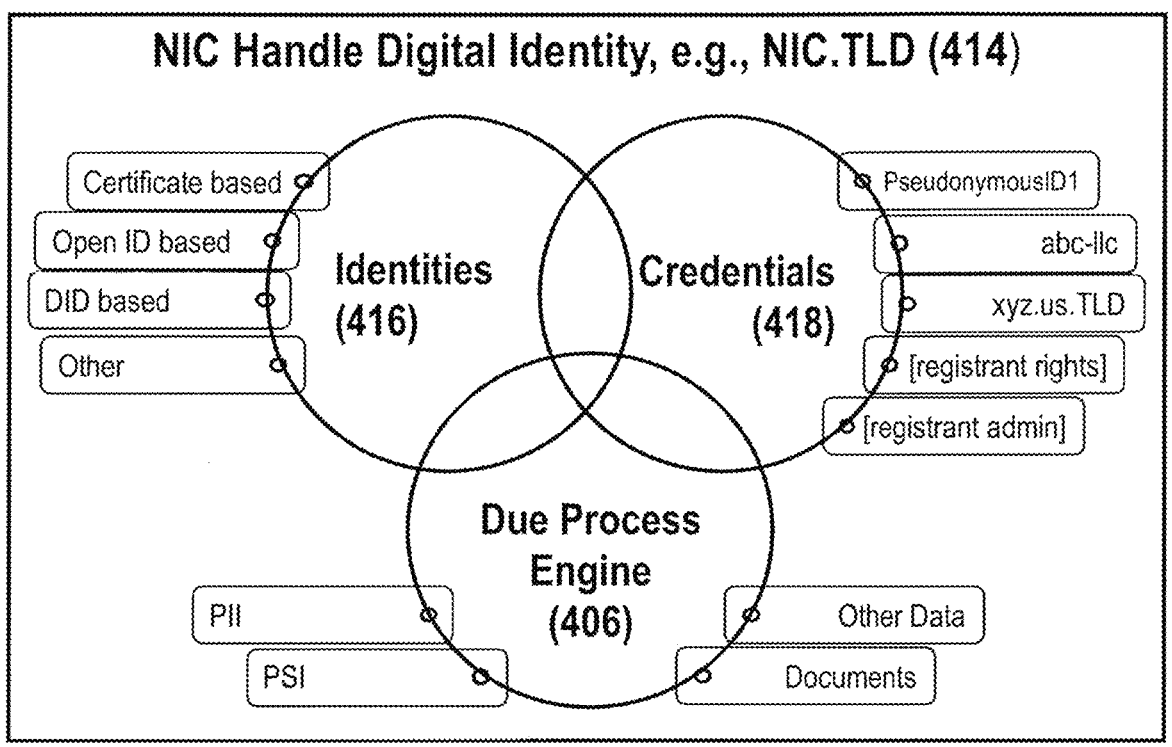
Figure 4D:
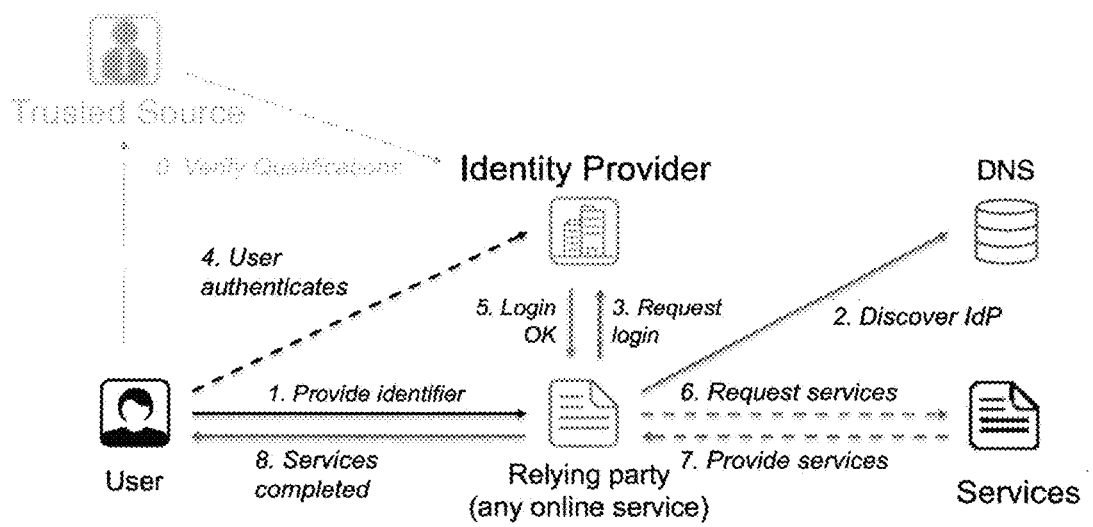

Upon receiving the user's digital identity credential request, the IdP may request documentation to verify identity and to validate the user's qualifications—shown as Step 0 in FIG. 4(d). As previously discussed, the level of KYC may be dependent on nature of digital identity privilege set being sought; e.g., law enforcement with bulk record access rights or private disputant/attorney with more limited rights, or a registrant associated with an organization that has the right qualifications to register domains on that TLD.

The user would then upload the appropriate documentation, which should be minimally retained by IdP under to a retention policy compliant with GDPR as well as other legal requirements to maintain business records. Identity information would preferably include citizenship, which would be an input for determining the appropriate "due process" rules for a Whois data request (along with, for example, where the IdP, and/or their data, resides, and/or where a registrar, and/or their data, resides). An example of such identity documentation can be found, for example, in ICAO Doc 9303.$^{xxxi}$ Qualification information could include, for example, proof of agency association (for law enforcement officer), proof of organization affiliation (for registrants or other domain name record contacts); proof of authorization (e.g., from a domain name owner for a prospective purchaser to obtain certain information about a certain domain record set—or for the purchaser to obtain verification of ownership without obtaining the record data itself).

IdP personnel may then validate the identity and qualifications to determine if the user should be accredited for the privilege set/access rights requested and generate a digital identity credential. The structure, format, and contents of the digital identity credential may vary depending on which authentication and verification approach is incorporated. Examples of approaches that may be used in accordance with invention are described in the W3C specification *Decentralized Identifiers (DIDs) v0.9*,$^{xxxii}$ the W3C specification *Verifiable Claims Data Model and Representations*,$^{xxxiii}$ the OAuth and OpenID Connect specifications, and the UPU's S64: Postal Identity Management specification. Another example of the use of OAuth with a distributed ledger and trust network can be found in papers written by Harjano et al: *Decentralized Service Architecture for OAuth2.0*$^{xxxiv}$ and *Anonymous Identities for Permissioned Blockchains*.$^{xxxv}$ A digital identity may be time-limited (and subject to renewal), or may be persistent until revoked (or re-issued, such as if compromised).

In such architectures as used in accordance with the invention in this illustrative example, a digital identity may include an EDIT as an access token that includes an appropriate "claim" for the user (e.g., as law enforcement, as private disputant, as registrant, etc.). A claim may include, as an example, a code or other representation of an authorization grant privilege set (e.g., bulk access rights for law enforcement, domain registration/management rights for registrants, etc.). The claim may be time limited or scope limited; e.g., it may be limited to a particular set of domain records, particular information in those records, or just to obtain verification of ownership without obtaining the actual data.

The user stores and activates digital identity credential, and confirmation is also sent to the IdP to be stored in the digital identity account maintained by the IdP for the user. In order to receive and store the digital identity credential, the user would preferably have an appropriate confidential client installed as their digital wallet; e.g., a web application, browser app, native mobile app (that may work in conjunction with other mobile apps such as Apple Wallet (or an Android equivalent). The digital identity and mobile app may implement FIDO for accessing and presenting the DID; i.e., the digital identity may not use password-based credentials, but instead biometric authentication or PKI from a registered access device where the digital wallet resides.

The digital identity credential creation transaction may also be validated and added into the pseudonymized record in the shared ledger. Transaction data here may include an access token identifier, a transaction code, and a timestamp, for example, or could also include data such as the claim/privilege set, accreditation data, etc., but not identifying information (such as contact data—name, email address, etc.) for the user. In this illustrative example, the validation method and ledger may use OAuth, Open ID Connect with Ethereum, expanding on a blockchain based DNS resolution system such as the aforementioned ENS Project, using EPP (Extensible Provisioning Protocol)$^{xxxvi}$ for processing domain name record data, and using a Proof of Authority based consensus for validation, such incorporated by Parity$^{xxxvii}$ or others, for writing custodial record to the blockchain—though the invention is not limited thereto. PoA validators on the trust network may be, for example, and authorized IdP, such as government agency, a registrar, a registry operator or other authorized party.

Figure 4E:
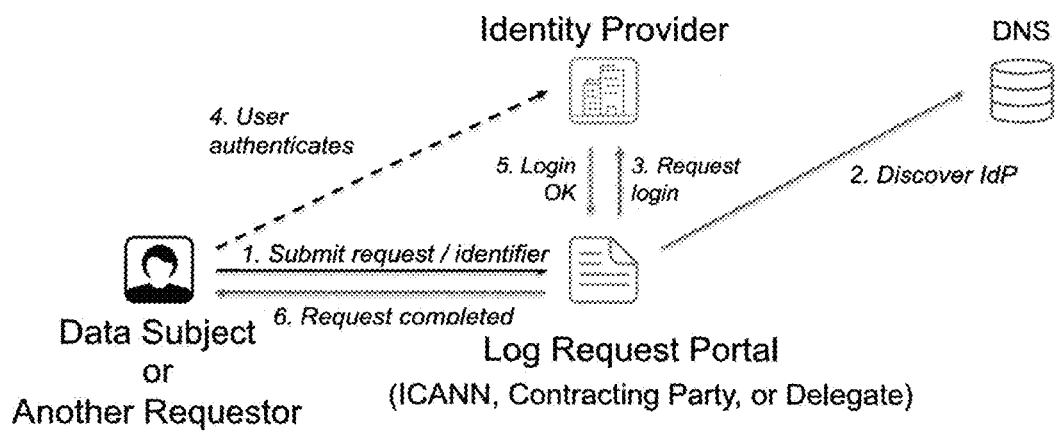

Tiered Access RDAP Service—Accredited User Seeks Whois Data. When a user submits an access request for Whois data to a registrar (or other service provider on the trust network having access to Whois data), the registrar would respond with a request for a digital identity credential (having an appropriate claim). The user would then provide their digital identity for verification (the digital identity includes, for example, a claim as a law enforcement agent in this example) using the designated EDIT. If the digital identity claim is validated, then the registrar provides requested Whois data to the User. This is illustrated in FIGS. 4(d)-(e), as discussed in more detail below.

After completing the transaction with the user, the registrar may then provide transaction data for validation and recording on the shared ledger—Ethereum in this example. This could be done directly by the registrar or through another authorized party (in the illustrated example, a custodial party authorized for managing custodial accounts). As previously noted, the transaction data would be pseudonymized; e.g., it would include a pointer associated with the EDIT. The pseudonymized transaction data is then validated and logged into the record. The transaction record can include other designated transactions as well, such as domain name registration or transfer (or other object: web site, web page, IoT device), updated records such as domain name contacts, etc. as further discussed herein.

Tiered Access RDAP Service—User Revokes their DID. A user may invoke a "right to be forgotten" and request that an IdP provide them with all of their identifying information and destroy all personal data in the IdP's possession. Upon receiving such a request, the IdP would request the user's digital identity, which the user would provide for verification using the designated EDIT in the manner as previously discussed. If the digital identity claim for is validated, the IdP would provide a copy of the identifying information for the user to the custodial party authorized to manage the user's custodial escrow account (which could be the IdP or another party).

This custodial party would store the identifying information for the user in an offline, segregated custodial escrow account, and would provide pseudonymized data for the revocation transaction for validation and adding to the shared ledger. Once the custodial party has confirmed the archiving of the identifying information, the IdP provides the requested personal data to the user. The IdP would then store a pointer associated with the digital identity (such as an access token, the EDIT, or other indicator) relationally to the transaction and any identifying information for the user and delete all identifying information for the user from their systems. Storing an appropriate pointer for the digital identity relationally to the IdP's own transaction records for the user enables those transactions records to be pseudonymized when the identifying information is deleted in a manner that enables the transaction records to still be later re-correlated with the user's identifying information under the "due process" rules, if the IdP is subject to an appropriate request for a complete transaction record.

Pseudonymized Whois Records—Registrar Segregates Identifying Information. If a user (such as a domain name registrant or a record contact) invokes their "right to be forgotten" with a registrar, the registrar would similarly request the user's digital identity for verification of their digital identity claim qualifications. If the user does not already have a digital identity, then the user would obtain one. This digital identity could be obtained from the registrar itself if the registrar is also authorized as an IdP, or from a third-party IdP. If the user only wishes to use the digital identity to complete their right to be forgotten, then the KYC required (and claim associated with the DID) may be limited to be commensurate with the existing identifying information for the user in the Whois records that are to be segregated (e.g., listed name, email address, mail address, phone number, etc.). This has the advantage of enhancing the ability to comply with data privacy regulations, for example, by not placing an undue burden on the user in invoking their right to be forgotten, while enhancing the ability of the service provider to comply with their data retention obligations.

In a manner similar to that discussed above, the registrar would also provide a copy of the identifying information for the user to the party authorized to manage the user's custodial account. This custodial party would store the identifying information for the user in an offline, segregated custodial escrow account, and would provide pseudonymized data for the revocation transaction for validation and adding to the shared ledger. Once the custodial party has confirmed the archiving of the identifying information, the registrar provides the requested personal data to the user. The registrar would then store a pointer associated with the digital identity (such as an access token, the EDIT, or other indicator) relationally to the transaction and delete all identifying information for the user from its Whois records—enabling the transaction records to still be later re-correlated with the user's identifying information under the "due process" rules if subject to an appropriate request for a complete transaction record.

Instead of being segregated in response to an individual request from a user, Whois data may also be bulk migrated to a segregated data model. Preceding the migration, the registrar would audit its existing user base and ensure that all users to be migrated have created DID's in the manner noted above.

Because individual actions with regard to a domain name record may be recorded as pseudonymized transactions in the shared ledger, an advantage of the invention is that it enables a historical, immutable record to be retained and not simply current Whois records. A system in accordance with the invention may be used, for example, to create and provide a chain of title (registrant history), an audit trail of historical changes to records to domain records such as updated contact information, etc.

Pseudonymized Records—Accredited User Seeks Historical Transaction Data. As previously noted, a system in accordance with the invention may be used to provide third parties with tiered access to "thick registry" domain name records that are stored in a segregated, pseudonymized manner but capable of being re-correlated with identifying information to create a complete record under an appropriate due process request. Employing a system of the invention in this manner has the advantage of enabling a registrar, registry, or other TLD service provider to help ensure that they comply with the requirements of privacy laws, such as the GDPR, while also retaining business records as needed to comply with various other laws and to provide access to those record as legally required. Such requests may be processed on a per request basis or under a "bulk access" subscription for qualified legitimate interest users.

A user request for bulk access to such records may include the legally recognized basis for the request (e.g., fraud investigation, IP dispute, prospective transferee to a domain name, etc.) and, in some cases, proof thereof (such as a subpoena or other authorization grant) and identification of the specific records requested to as inputs to determining the "due process" request requirements. Proof of authorization may also be inherent in the digital identity credential. For example, it may be a temporary digital identity credential issued only for providing access to certain transaction data on a one-time/limited-time basis, such as if a registrant authorized issuance of an "ownership verification" digital identity credential to a prospective purchaser of domains, or may be inherent to the identity of the legitimate interest user; i.e., law enforcement agencies or members of the IP community may subscribe under a bulk access agreement that designates their right to access for designated legitimate interests without the need for additional proof on a "per request" basis.

Similar to the ICANN UDRP model, in which all domain name registrants are legally subject to a potential UDRP proceeding for dispute resolution, legitimate interest users may be required to execute an access agreement that subjects them to potential alternative dispute resolution (ADR) proceedings initiated by a Data Subject, as well as ADR proceedings initiated by a Registration Authority seeking to revoke that user's access due to documented abuse. This is a mechanism by which a Data Subject can exercise their rights to challenge a legitimate interest user who exceeds their authorized access to the Personal Data of a Data Subject under this differential access model. The rules and policies for this ADR process may be modeled in the spirit of ICANN's original Uniform Dispute Resolution Policy (UDRP).

Qualified Administrative Dispute Provider(s) (ADP's") may be used for the ADR proceedings, like those that currently administer UDRP and URS complaints, though these complaints be based allegations regarding whether a legitimate interest user violated the terms their authorized access to and use of Whois data with respect to a n impacted Data Subject's Personal Data. This function may also be coordinated by privacy authorities, such as the European Data Protection Board ("EDPB") for example. Under the powers granted by the GDPR, the EDPB has the ability to provide thought leadership in establishing best practices or certification frameworks for ADR proceedings as described herein. Privacy authorities like the EDPB may also provide guidance on decertification of ADP's if the quality of the decisions failed to meet certain standards.

Under a bulk access subscription, legitimate interest users may also be required to provide a financial instrument (such as a performance bond or a Letter of Credit) to help ensure that Data Subjects could be made whole upon a successful ADR proceeding. The amount of the financial instrument may vary based upon several factors: estimated number of queries per month, number of individuals/organizations relying on a given financial instrument, flags for prior violations, etc. For example, Letter of Credit may be used based upon those currently held by those Registry Operators that were part of the 2012 round of new gTLD's in connection with their Continuing Operations Instrument (COI). After some initial confusing within the banking community about issuing these instruments and their specific wording, ICANN, Registry Operators and the banking community established a working understanding of the legal and operational parameters of the documents. Similar to the COI's, in which a triggering event is a declaration by ICANN that there had been a disruption of key registry services, the triggering event causing the release of funds to a Data Subject from the access-based financial instrument could be an adverse decision by an ADR panel. Legitimate interest users to may enter into multiple Letters of Credit with different TLD's and/or registrars, or a single Letter of Credit could be used to cover access across multiple Registration Authorities.

Similar to the request process previously discussed, a user (such as a law enforcement agent) would submit an access request for Whois data to a registrar (or other service provider). The registrar would request a digital identity credential having an appropriate accredited claim, the user would provide their digital identity credential, and the digital identity credential would be verified as previously discussed. Once the user's qualifications to receive the Whois data requested have been verified, the registrar obtains the pseudonymized transaction data from the shared ledger and requests identifying information for the transaction data from the IdP. Either or both of these steps may be done directly or through an authorized third party, such as the custodial party.

The appropriate IdP would then provide the identifying information needed for each associated digital identity based on the pointers that are stored with the pseudonymized Whois records. However, if a user whose digital identity is associated with historical Whois records had previously invoked their "right to be forgotten" with the IdP (revoking their digital identity credential as previously discussed), then a request for the identifying information would be processed in accordance with the "due process" rules to determine what access requirements apply to obtaining the identifying information (for example, the citizenship of each user's whose identifying information is being requested, where the transactions occurred, where the IdP and/or registrar, and/or their data, reside, etc.), and whether those requirements have been met (for example, are the qualifications in the claim for the digital identity of the user seeking the information sufficient, has sufficient proof of authorization been provided, etc.).

This could include be accomplished, for example, using smart contract as previously described, where the smart contract code would be used to process the relevant information: for the digital identity of the users whose identifying information is being sought, for the digital identity of the user who is seeking information, and for the transaction records themselves (e.g., the registrar involved, the IdP involved, the transaction data being sought etc.). If the "due process" requirements are satisfied, then the identifying information may be retrieved from the offline archive by the user's authorized custodial party and provided to the registrar for completing the transaction record and providing it to the requesting party.

The rules for determining whether an access request has exceeded authorization, and procedures for further action, may also be incorporated into the "due process" rules of the system of the invention when a legitimate interest user seeks retrieve and use Whois records. For example, if a legitimate interest user access domain records that they are not authorized to access (whether based on volume, or type of domain, registrant, etc.) or if that user takes an improper action using those records that is reported and flagged in the system, the user's access rights may be automatically restricted, suspended, or revoked; impacted Data Subjects or other interested parties (such as a relevant Data Protection Authority) may be automatically notified, a Letter of Credit or other financial instrument may be triggered upon a reporting of an adverse action or other designated flag with respect to that legitimate interest user's digital identity credentials, etc.

As noted above, a system in accordance with the invention also enables Registration Authorities to collect fees from legitimate interest users as micropayments at a transactional level, such as per request, per record retrieved, etc. These fees may be established, for example, as part of a bulk access agreement and paid in a number of ways. The distributed ledger could be established with a cryptocurrency, for example, that could be mined as part of verification of the Whois access request and allocated using smart contracts (along the lines of "conventional" blockchain currency transactions).

Alternatively, blockchain tokens may be used to represent real-world funds in a financial account, and the tokens transferred to the Registration Authority as the micropayment are documented in the distributed ledger and can be "redeemed" by the Registration Authority to collect funds from the financial account. As one example, this financial account could be an escrow that is paid into by the legitimate interest user, and transfer of the tokens to the Registration Authority is a release condition that enables the Registration Authority to transfer funds equal to the agreed amount established for the tokens. Such an escrow could also be established as a pool among Registration Authorities in an ecosystem (e.g., for a given TLD), by a Registration Authority for multiple legitimate interest users, or by a legitimate interest user for multiple Registration Authorities. The blockchain-based token transfers may also be integrated with other online payment services (e.g., PayPal, Google Checkout, Amazon Pay, Dwolla, Stripe, etc.) for payments to the appropriate amount to be processed based on a transfer of tokens.

A platform to support the above illustrative example may be structured as shown in FIGS. 4(b) and 4(c), though those of ordinary skill in the art will appreciate that the invention is not limited thereto. As shown in FIG. 4(b):

An IDM Service Portal (404) may include tools for IdP's (e.g., a Registry Operator, a Registrar, or an authorized verification organization such as an eID provider, and IGO, or agency of a sovereign government) and individual users to manage their credentials for use across service providers (e.g., Registrars) for a TLD ecosystem, or across multiple TLD ecosystems.

An Authentication SDK (408), such as an OAuth-based service that may integrate with various compatible digital identity authentication schemes to authenticate digital identity credentials for various actions; e.g., registration (or transfer) of domain names, modification of domain name record data, managed access to domain records by third party Requestors (as previously noted, digital identity credentials may be compliant with the UPU's S.64/S.68 digital identity framework, OpenID Connect, and FIDO, eIDAS, the W3C's DID specification, and other frameworks)

An Escrow Architecture (412) may manage a custodial escrow account for storing personally identifying information (e.g. Registrant contact information) for pseudo-anonymous credentials that are associated with a user A Due Process Engine (406) may use smart contracts, PKI, and related technology to verify requests for access to personally identifying information for various domain names or domain name transactions, and to re-correlate that information from escrow with the domain records and/or transactions in accordance with applicable "due process" rules (e.g. for bulk access requests, domain disputes, confirmation of ownership)

A Distributed Ledger SDK (410) may enable permissioned providers on a trust network for the TLD (e.g., a Registry Operator, a Registry Provider, Registrars, and authorized third party verification organizations) to use a distributed ledger (aka a "blockchain" or "DLT") to:

Share pseudonymized (e.g., tokenized using a NIC Handle) domain record data

Share an immutable history of pseudonymized domain name record transactions (e.g. registration, transfers, changes to contacts, access requests)

Use tokens for allocating any applicable revenue (such as for third party requests to access a user's personal data) or costs (such as for dispute resolution, or group cybersecurity insurance, etc.) among providers on the network for the TLD (or multiple TLD's) as agreed Such a platform may be operated as further described.

A Registry Operator or an authorized IdP verifies a user and issues credentials. Each user's credentials for a TLD (or for use across multiple TLD's) may be issued by the Registry Operator (or an IdP authorized by them) using a set of verification digital identity tools accessed through the IDM Service Portal. Users can also manage their credentials through the portal. Each Registrant organization, for example, may have a primary administrative contact, who may receive a digital identity having a credential (and duration, e.g., renewal period) for that organization to register, modify, and transfer one or more domain names, and another claim/attestation that the administrative contact is authorized to act on behalf of that organization (and to authorize digital identities for others in that organization). Each attestation will have a certificate signed with a unique PKI (public/private key pair) generated using the digital identity tools. In addition to Registrants, all third-parties that wish to request access to the domain records (such law enforcement or an IP attorney) will also use verified credentials that authenticate their authorization to access domain name information through the Registry Operator and/or Registrars. The digital identity tools can also be used for the renewal or re-issue of credentials.

User credentials are associated with a compatible digital identity framework. The platform may incorporate an OAuth based Authentication SDK that enables a user's credentials to be authenticated using a number of compatible frameworks. This may include, for example, a federated OpenID Connect based systems and "certificate" based systems,[xxxviii] or a combination of the two (such as proposed by the IETF OAuth working group[xxxix]). As previously noted, it may also include implementations of the W3C's "decentralized" digital identifiers with "verifiable credentials." Credentials may also be associated with compatible eID implementations under the EU's eIDAS (such as further described in connection with the Escrow Architecture). Digital identity credentials will be registered to a user's preferred device (such as a smartphone) and authenticated from that device in a FIDO compliant manner. Using the system of the invention, the user's TLD credentials may thus be bound to the user's digital identity (eID, DID, etc.) via the IDP using the Escrow Architecture.

Credentials may be pseudonymized. When a user's .TLD credentials are created, they may be stored in the custodial escrow (402) for that user along with the user's relevant personal data and a pseudonym, using the Escrow Architecture. This will be either an existing escrow account or a new one created through the IDM Services Portal at that time. The escrow account may be maintained, for example, by a Registry Operator, an authorized IdP, or a designated escrow agent. Each user's escrow file (particularly for Registrants) may be represented by a NIC Handle or other domain identifier. In this illustrative embodiment, it may contain the user's relevant personal data (or a pointer to an authoritative source for that data); information for each of the user's digital identities used with their TLD credentials or any other digital identity credentials for an ecosystem incorporating the escrow; a pseudonym, "status" (e.g., duration, active, revoked, etc.) and other information for each credentials itself; and URI's for relevant encrypted documents.

Access to the personal data—or "abstractions" of that personal data (e.g., validate "over 18" versus date of birth; and validate "authorized TLD Registrant" versus country of citizenship)—may be processed through the Due Process Engine, which may validate access requests based on the agreed "due process" rules. The "due process" rules may allow for different rules for natural and legal persons and may also include retention of the relevant personal data for each pseudonymous credential in the escrow until there is no longer a lawful purpose for accessing that personal data. Each user's escrow may be segregated from the others with a distinct authentication for online access. This minimizes the ability for unauthorized access across multiple accounts. An illustration of the Escrow Architecture is shown in FIG. 4(c).

Pseudonymized transactions may be recorded within the ecosystem. As further illustrated in FIG. 4(d)-(e), when a user submits a request for a transaction with a Registrar or a Registry Operator (such as a domain registration or record change or a third-party request for data), the user will be prompted to present their verified credential, which may incorporate a pseudonym instead of identifying information, as noted previously—Step 1. This credential is authenticated through the Authentication SDK—Steps 2-5, and the Registrar (or a Registry Operator) takes the action requested—Steps 6-8 in FIG. 4(d), or Step 6 in FIG. 4(e). The pseudonym (e.g., a NIC Handle) may be used in the domain record data itself in lieu of identifying information for the Registrant or other record contact. That is, identifying data for a Registrant, domain contact, or other party to a domain related "transaction" may be replaced with a MC Handle that acts as a pointer to the escrow account containing the relevant personal identifying information. All identity information may be retained in the escrow account, as maintained either by the IDP who issued the digital identity or an escrow agent. In compliance with the "due process" rules, the pseudonym may be used to obtain relevant personal data from the escrow, including contact information.

A pseudonymized record of domain related transactions may also be recorded in a DLT using the DLT SDK. A tokenized transaction record using the Registrant's NIC Handle (or the pseudonym for any third parties authorized to request access to domain data pseudonymously) is what is stored in the blockchain. The DLT SDK may track use of a pseudo-anonymous credentials for transactions (and requests for transaction records) to identify any abuse, and credentials can be appropriately revoked through the digital identity tools on the IDM Service Portal.

The DLT SDK enables the RDAP framework to be expanded to also create a historical record of designated transactions related to a domain name registration. It may also be used to provide pseudonymized RDDS (Whois) data publicly. This will create a RDDS database for a TLS's domains that is compliant with applicable data privacy regulations and will create an authoritative chain of title for domain name transfers, record changes to a domain (like updating contact identifiers), and the ability to detect abusive activity. Additional transactions related to domains for a TLD could also be added to the TLD's ledger beyond those related to the domain registrations themselves, such as documentation or verification of web sites, web pages, postings and other online content. Depending on what level of "transaction" being recorded on the blockchain, the ecosystem can be extended to ISP's, web service providers, or others.

Third party requests are verified under agreed rules and authorized records are provided. As noted above, both Registrant related users and third parties Requestors seeking access to domain record data may be authorized to obtain verified credentials. If a third-party Requestor (e.g., law enforcement or an IP attorney) seeks to obtain a complete transaction record (e.g. complete domain record data that includes any identifying information for natural persons), the scope of the Requestor's authorization (e.g., subscription for "bulk" access, a subpoena, power of attorney, etc.) may first be verified using the Authentication SDK.

The Due Process Engine may then use the agreed "due process" rules to verify authorization to access to each specific user's personal data in escrow with respect to the requested TLD domain records and/or additional transactions stored in the DLT (using smart contracts or similar technology). As previously discussed herein, the "due process" rules applicable to particular users and transactions may be determined based on relevant data contained within the digital identity, the identifying information, the transaction data, or elsewhere. This includes, for example, the country of citizenship associated with the digital identity, a jurisdiction in which the user resides, a jurisdiction of formation for a service provider who transacted with the user, a jurisdiction in which a service provider who transacted with the user resides, a jurisdiction of formation for an IdP who issued the digital identity, a jurisdiction in which an IdP who issued the digital identity resides, a jurisdiction of formation of a custodial party authorized to access the identifying information on behalf of the user based on the "due process" rules, a jurisdiction in which a custodial party authorized to access the identifying information on behalf of the user based on the "due process" rules resides, and a jurisdiction in which the data for custodial account containing the identifying information resides. These rules may be adaptable over time to address changes in the law or other requirements. The custodial account may be segregated from the custodial accounts for other users and accessed on a single request/single account basis. If the scope of the Requestor's access, the access request itself, and the rules regarding a user's personal data are all verified, then the appropriate identity information may be retrieved from escrow accounts re-correlated with the specific transactions from the DLT for the TLD and provided to the requestor as a complete, verified history for those transactions.

The invention can be realized in hardware, software, or a combination of hardware and software. Any kind of computing system, or other apparatus adapted for carrying out the methods described herein, is suited to perform the functions described herein. A typical combination of hardware and software could be a specialized or general-purpose computer system having one or more processing elements and a computer program stored on a storage medium that, when loaded and executed, controls the computer system such that it carries out the methods described herein. The invention can also be embedded in a computer program product, which comprises all the features enabling the implementation of the methods described herein, and which, when loaded in a computing system is able to carry out these methods. Storage medium refers to any volatile or non-volatile storage device. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

END NOTES

The references cited below are hereby incorporated by reference herein in their entirety.

[i] http://pubdocs.worldbank.org/en/579151515518705630/ID4D-Technical-Standards-for-Digital-Identity.pdf

[ii] https://www.tripwire.com/state-of-security/security-data-protection/cyber-security/takeaways-from-the-2016-verizon-data-breach-investigations-report/
[iii] http://www.creditcards.com/credit-card-news/credit-card-security-id-theft-fraud-statistics-1276.php
[iv] https://www.juniperresearch.com/press/press-releases/iot-connected-devices-to-triple-to-38-bn-by-2020
[v] https://www.cepro.com/article/z_wave_scores_huge_ul_win_for_security_a_first_for_mesh_technology
[vi] https://kresbsonsecurity.com/2016/10/hacked-cameras-dvrs-powered-todays-massive-internet-outage/
[vii] https://fidoalliance.org/specifications/overview/
[viii] https://www.gov.uk/government/publications/introducing-govuk-verify/introducing-govuk-verify
[ix] https://www.digid.nl/en/
[x] https://joinup.ec.europa.eu/node/123843?utm_source=epractice&utm_medium=epractice&utm_campaign=epractice
[xi] http://ec.europa.eu/idabc/en/document/4486/5584.html
[xii] http://www.cryptovision.com/wp-content/uploads/2015/06/Mindshare-2015-D2-1100G-Pem-eID.pdf
[xiii] https://eur-lex.europa.eu/legal-content/EN/TXT/?uri=uriserv:OJ.L_.2014.257.01.0073.01.ENG
[xiv] https://www.oauth.com/oauth2-servers/map-oauth-2-0-specs/
[xv] http://openid.net/developers/specs/
[xvi] https://en.wikipedia.org/wiki/Security_Assertion_Markup_Language
[xvii] https://developer.apple.com/wallet/
[xviii] http://www.openidentityexchange.org/wp-content/uploads/2017/06/OIX-White-Paper_Trust-Frameworks-for-Identity-Systems_Final.pdf
[xix] http://www.upu.int/en/activites/standards/standards-documents.html
[xx] https://github.com/ethereum/ens
[xxi] https://gitlab.com/ID4me/documentation/blob/master/id4me%20Technical%20Overview%20v1.3.pdf
[xxii] https://www.multichain.com/developers/
[xxiii] https://github.com/hyperledger/fabic
[xxiv] https://github.com/corda/corda
[xxv] https://github.com/dragonchain/dragonchain
[xxvi] https://blog.ethereum.org/2014/12/31/silos/
[xxvii] https://ethereum.github.io/yellowpaper/paper.pdf
[xxviii] https://www.ethereum.org/token
[xxix] https://github.com/topics/ethereum
[xxx] https://www.icann.org/en/system/files/files/gdpr-memorandum-part2-18dec17-en.pdf
[xxxi] https://www.icao.int/publications/pages/publication.aspx?docnum=9303
[xxxii] https://w3c-ccg.github.io/did-spec/
[xxxiii] https://w3.org/TR/verifiable-claims-data-model/
[xxxiv] https://tools.ietf.org/html/draft-hardjono-oauth-decentralized-02
[xxxv] http://connection.mit.edu/up-content/uploads/sites/29/2014/12/Anonymous-Identities-for-Permissioned-Blockchains2.pdf
[xxxvi] https://icann.org/en/system/files/files/epp-status-codes-30jun11-en.pdf
[xxxvii] https://wiki.parity.io
[xxxviii] Such as the approaches discussed at the ICANN General Meeting in Barcelona: http://regiops.net/wp-content/uploads/2018/05/7-ROW7_Auth_Comparison_TO_051718_2.pdf and https://tools.ietf.org/id/draft-hollenbeck-regext-rdap-openid-08.html
[xxxix] https://datatracker.ietf.org/doc/html/draft-ietf-oauth-mtls-12

What is claimed is:

1. A digital identity apparatus, wherein the verification of at least one qualification of a user is used to generate a credential associated with a digital identity account maintained with an identity provider for authorizing the user to engage pseudonymously in a transaction online with a provider, and wherein a pseudonymous identifier associated with the credential is configured to enable identifying information about the user to be correlated to the transaction in relation to the automated processing of an access request by a third party using due process rules to determine providing at least a portion of the identifying information for the user to the third party, the digital identity apparatus comprising:

at least one digital identity memory configured to store digital identity data for the user associated with the digital identity account maintained by the identity provider and having associated authentication data used for the authentication of the digital identity to authenticate the user as an authenticated user to present a pseudonymous credential associated with the digital identity account to engage in the transaction online with the provider;

a storage device storing a data container having at least one credential associated with the digital identity account that is accessible by the authenticated user through the user interface of a computing device configured to enable the user to present the credential online pseudonymously to the provider, the credential comprising:

credential data based on the verification of the at least one qualification of the user configured for use in authorizing the user to engage in the transaction online with the provider; and at least one pseudonymous identifier configured for use in verifying the qualification of the user for authorizing the user to engage in the transaction online with the provider and for being stored in a pseudonymized record of the transaction between the user and the provider; and a custodial escrow memory associated with the digital identity account maintained by the identity provider configured to store identifying information for the user segregated from the pseudonymized transaction record; and a due process rules engine comprising a processor and software configured to:

automatically process information in an access request inputted by a third party for identifying information about the user correlated to the pseudonymized transaction record using a set of due process rules to determine whether the third party is authorized to receive the identifying information stored in the custodial escrow memory for the user in relation to the transaction data stored in the pseudonymized transaction record;

correlate the identifying information for the user with a transaction in the pseudonymized transaction record using the pseudonymous identifier to create a combined record of the transaction; and provide the combined record to the authorized third party based on the determination under the due process rules.

2. The apparatus of claim 1, wherein the at least one credential is created based upon a verification of the at least one qualification of the user by a trusted source.

3. The apparatus of claim 1, wherein the at least one credential incorporates an extensible digital identity token (EDIT) for use in one or more selected from the group consisting of verifying the qualification of the user for authorizing the individual to engage in the transaction online and creating the pseudonymized transaction record.

4. The apparatus of claim 1, wherein the pseudonymous identifier is configured for use for discovering the digital identity account with the identity provider.

5. The apparatus of claim 1, wherein the inputted information includes one or more selected from the group consisting of a country of citizenship associated with a user, a jurisdiction in which a user resides, a qualification of a user as a natural person, a qualification of a user as a legal person, the credential data for a user who is an authorized third party, data indicating the legitimate interest for requesting the identifying information for user, a jurisdiction of formation for the provider in the transaction with the user, a jurisdiction in which the provider in the transaction with the user resides, a jurisdiction of formation for the identity provider maintaining the digital identity account, a jurisdiction in which the identity provider maintaining the digital identity account resides, a jurisdiction of formation of the authorized third party accessing the identifying information of the user, a jurisdiction in which the authorized third party accessing the identifying information of the user resides, and a jurisdiction in which the data for custodial escrow containing the identifying information resides.

6. The apparatus of claim 1, wherein the custodial escrow may be segregated from the custodial accounts for other users and accessed on a single request/single account basis.

7. The apparatus of claim 1, wherein the transaction is one or more selected from the group consisting of creation of a digital identity, the modification of a digital identity, the segregation of identifying information for a digital identity into the custodial escrow, a request for the identifying information from the custodial escrow based on the due process rules, the renewal of a digital identity, the compromising of a digital identity, the revocation of a digital identity, a request for record data for one or more domain names, the registration of one or more domain names to a registrant, the transfer of one or more domain names to a new registrant, the modification of record data for one or more domain names, and the verification of web content, web pages, web sites, or 10T devices.

8. The apparatus of claim 1, wherein the pseudonymized transaction record is stored in a shared ledger on a trust network and wherein the pseudonymized transaction record is validated by a consensus protocol prior to being added to the shared ledger.

9. The apparatus of claim 8, wherein the shared ledger is configured for processing a micropayment based on the access to one or more transaction records.

10. The apparatus of claim 8, wherein transactions in the pseudonymized transaction record of one or more transactions are stored in the shared ledger in a serialized form, in which a new transaction is added based upon a cryptographic hash with prior transactions stored in the shared ledger.

11. The apparatus of claim 8, wherein the due process rules are determined by the processor using a smart contract.

* * * * *